(12) United States Patent
Ye et al.

(10) Patent No.: US 11,907,096 B2
(45) Date of Patent: Feb. 20, 2024

(54) DATABASE SIMULATION MODELING FRAMEWORK

(71) Applicant: Microsoft Technology Licensing, LLC, Redmond, WA (US)

(72) Inventors: Zi Ye, Redmond, WA (US); Justin Grant Moeller, Eden Prairie, MN (US); Ya Lin, Bellevue, WA (US); Willis Lang, Edina, MN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 17/565,815

(22) Filed: Dec. 30, 2021

(65) Prior Publication Data

US 2023/0214306 A1    Jul. 6, 2023

(51) Int. Cl.
  *G06F 16/00*    (2019.01)
  *G06F 11/34*    (2006.01)
  (Continued)

(52) U.S. Cl.
  CPC ...... *G06F 11/3433* (2013.01); *G06F 11/3006* (2013.01); *G06F 11/3457* (2013.01); *G06F 16/217* (2019.01); *G06F 16/27* (2019.01)

(58) Field of Classification Search
  CPC ............. G06F 11/3433; G06F 11/3006; G06F 11/3457; G06F 16/217; G06F 16/27
  See application file for complete search history.

(56) References Cited

U.S. PATENT DOCUMENTS

2014/0130076 A1* 5/2014 Moore ............ H04N 21/25883
                                            725/19
2016/0057219 A1* 2/2016 Kore ................... H04L 67/1097
                                            709/248
(Continued)

FOREIGN PATENT DOCUMENTS

CN    115878684 A  *  3/2023

OTHER PUBLICATIONS

Wang et al., "Performance Modelling and Optimisation of NoSQL Database Systems", Dec. 2019, Performance Evaluation Review, vol. 47, pp. 1-4 (Year: 2019).*

(Continued)

*Primary Examiner* — Alexander Khong
(74) *Attorney, Agent, or Firm* — Weaver IP L.L.C.

(57)    ABSTRACT

Methods, systems, and computer program products are provided for creating a resource management testing environment. An initial population of databases is established in a database ring, having an in initial count of databases and different types of databases that are determined based on an initial database population model. The initial population model receives ring classification information for the database ring from a ring grouping model. A sequence of database population-change events is generated based on a model, to change the population of the databases over time in the ring. An orchestration framework performs testing of resource manager operations based on the model-defined initial population of databases and the model-defined populations of databases changed over time. Model-defined resource usage metrics for each database are utilized to test the resource manager operations. Resource usage metrics and database add/drop events of a production system are used to train the models.

23 Claims, 8 Drawing Sheets

(51) Int. Cl.
*G06F 16/27* (2019.01)
*G06F 16/21* (2019.01)
*G06F 11/30* (2006.01)

(56) References Cited

U.S. PATENT DOCUMENTS

| | | | |
|---|---|---|---|
| 2020/0050494 A1 | 2/2020 | Bartfai-Walcott et al. | |
| 2020/0174966 A1* | 6/2020 | Szczepanik | G06F 16/13 |
| 2021/0110924 A1* | 4/2021 | Tkach | G16H 20/70 |
| 2022/0083985 A1* | 3/2022 | Negulescu | G06Q 10/1091 |

OTHER PUBLICATIONS

"Azure SQL Database Pricing", Retrieved from: https://web.archive.org/web/20210506045032/https://azure.microsoft.com/en-us/pricing/details/azure-sql-database/single/, Retrieved on: May 6, 2021, 31 Pages.

"Azure-Kusto-Data 2.3.2", Retrieved from: https://pypi.org/project/azure-kusto-data/, Oct. 7, 2021, 4 Pages.

"Custom Resources", Retrieved from: https://web.archive.org/web/20200329171536/https://kubernetes.io/docs/concepts/extend-kubernetes/api-extension/custom-resources/, Mar. 16, 2020, 10 Pages.

"Scipy.Stats.Kstest", Retrieved from: https://web.archive.org/web/20211024200212/https://docs.scipy.org/doc/scipy/reference/generated/scipy.stats.kstest.html, Oct. 24, 2021, 2 Pages.

"SLA for Azure SQL Database", Retrieved from: https://azure.microsoft.com/en-us/support/legal/sla/azure-sql-database/v1_4/, Jul. 2019, 3 Pages.

Abanda, et al., "A Review on Distance Based Time Series Classification", in Journal of Data Mining and Knowledge Discovery, vol. 33, Nov. 1, 2018, pp. 378-412.

Agarwal, et al., "Recover using Automated Database Backups—Azure SQL Database & SQL Managed Instance", Retrieved from: https://web.archive.org/web/20201218133215/https://docs.microsoft.com/en-us/azure/azure-sql/database/recovery-using-backups, Nov. 13, 2020, 13 Pages.

Antonopoulos, et al., "Socrates: The New SQL Server in the Cloud", in Proceedings of the International Conference on Management of Data, Jun. 30, 2019, pp. 1743-1756.

Bose, et al., "Probabilistic Demand Forecasting at Scale", in Proceedings of the VLDB Endowment, vol. 10, Issue 12, Aug. 2017, pp. 1694-1705.

Boutin, et al., "Jetscope: Reliable and Interactive Analytics at Cloud Scale", in Proceedings of the VLDB Endowment, vol. 8, Issue 12, Aug. 2015, pp. 1680-1691.

Breiman, Leo, "Random Forests", in Journal of Machine Learning, vol. 45, Issue 1, Oct. 2001, pp. 5-32.

Buck, et al., "vCore Purchase Model Overview—Azure SQL Database", Retrieved From: https://docs.microsoft.com/en-us/azure/azure-sql/database/service-tiers-sql-database-vcore, Feb. 11, 2021, 10 Pages.

Burns, et al., "Borg, Omega, and Kubernetes", in Journal of Queue, vol. 14, Issue 1, Jan. 2016, pp. 70-93.

Calheiros, et al., "Workload Prediction Using ARIMA Model and Its Impact on Cloud Applications' QoS", in Journal of IEEE Transactions on Cloud Computing, vol. 3, Issue 4, Aug. 20, 2014, pp. 449-458.

Caron, et al., "Forecasting for Grid and Cloud Computing On-Demand Resources Based on Pattern Matching", in Proceedings of IEEE Second International Conference on Cloud Computing Technology and Science, Nov. 30, 2010, pp. 456-463.

Casale, et al., "Markovian Workload Characterization for QoS Prediction in the Cloud", in Proceedings of IEEE 4th International Conference on Cloud Computing, Jul. 4, 2011, pp. 147-154.

Chawla, et al., "Revenue Maximization for Query Pricing", in Proceedings of the VLDB Endowment, vol. 13, Issue 1, Sep. 2019, pp. 1-14.

Das, et al., "Automated Demand-driven Resource Scaling in Relational Database-as-a-Service", in Proceedings of the International Conference on Management of Data, Jun. 26, 2016, pp. 1923-1934.

Das, et al., "CPU Sharing Techniques for Performance Isolation in Multi-Tenant Relational Database-as-a-Service", in Proceedings of the VLDB Endowment, vol. 7, Issue 1, Sep. 2013, pp. 37-48.

Demarne, et al., "Reliability Analytics for Cloud Based Distributed Databases", in Proceedings of ACM SIGMOD International Conference on Management of Data, Jun. 14, 2020, pp. 1479-1492.

Depoutovitch, et al., "Taurus Database: How to be Fast, Available, and Frugal in the Cloud", in Proceedings of ACM SIGMOD International Conference on Management of Data, Jun. 14, 2020, pp. 1463-1478.

Difallah, et al., "OLTP-Bench: An Extensible Testbed for Benchmarking Relational Databases", in Proceedings of the VLDB Endowment, vol. 7, Issue 4, Dec. 1, 2013, pp. 277-288.

Draper, et al., "Applied Regression Analysis", in 3rd Edition, Wiley, Apr. 23, 1998, 7 Pages.

Elmore, et al., "Characterizing Tenant Behavior for Placement and Crisis Mitigation in Multitenant DBMSs", in Proceedings of ACM SIGMOD International Conference on Management of Data, Jun. 22, 2013, pp. 517-528.

Erdelt, Patrickk. , "A Framework for Supporting Repetition and Evaluation in the Process of Cloud-based DBMS Performance Benchmarking", Retrieved from: http://www.tpc.org/tpctc/tpctc2020/documents/a-framework-for-supporting-repetition-and-evaluation-in-the-process-of-cloud-based-dbms-performance-benchmarking.pdf, Aug. 31, 2020, 13 Pages.

Friedman, Jeromeh. , "Greedy Function Approximation: A Gradient Boosting Machine", in Journal of the Annals of Statistics, vol. 29, Issue 5, Oct. 2001, pp. 1189-1232.

Furman, et al., "Azure SQL Database and Azure SQL Managed Instance Service Tiers", Retrieved from: https://web.archive.org/web/20200805041509/https://docs.microsoft.com/en-us/azure/azure-sql/database/service-tiers-general-purpose-business-critical, Jan. 30, 2020, 6 Pages.

Gong, et al., "PRESS: Predictive Elastic ReSource Scaling for cloud Systems", in Proceedings of International Conference on Network and Service Management, Oct. 25, 2010, pp. 9-16.

Greenberg, et al., "The Cost of a Cloud: Research Problems in Data Center Networks", in Journal of ACM Sigcomm Computer Communication Review, vol. 39, Issue 1, Jan. 2009, pp. 68-73.

Islam, et al., "Empirical Prediction Models for Adaptive Resource Provisioning in the Cloud", in Journal of Future Generation Computer Systems, vol. 28, Issue 1, Jan. 2012.

Kakivaya, et al., "Service Fabric: A Distributed Platform for Building Microservices in the Cloud", in Proceedings of the Thirteenth EuroSys Conference, Apr. 23, 2018, 15 Pages.

Khan, et al., "Workload Characterization and Prediction in the Cloud: A Multiple Time Series Approach", in Proceedings of IEEE Network Operations and Management Symposium, Apr. 16, 2012, pp. 1287-1294.

Lambert, Diane, "Zero-Inflated Poisson Regression, With an Application to Defects in Manufacturing", in Journal of Technometrics, vol. 34, issue 1, Feb. 1992, pp. 1-14.

Lang, et al., "Microsoft Azure SQL Database Telemetry", in Proceedings of the Sixth ACM Symposium on Cloud Computing, Aug. 2015, pp. 189-194.

Lang, et al., "Not for the Timid: On the Impact of Aggressive Over-Booking in the Cloud", in Proceedings of the VLDB Endowment, vol. 9, Issue 13, Sep. 2016, pp. 1245-1256.

Lang, et al., "Towards Multi-Tenant Performance SLOs", in Proceedings of IEEE 28th International Conference on Data Engineering, Apr. 1, 2012, pp. 702-713.

Li, et al., "Understanding Data Survivability in Archival Storage Systems", in Proceedings of 5th Annual International Systems and Storage Conference, Jun. 4, 2012, 12 Pages.

Marcus, et al., "WiSeDB: A Learning-based Workload Management Advisor for Cloud Databases", in Proceedings of the VLDB Endowment, vol. 9, Issue 10, Jun. 2016, pp. 780-791.

Matt, et al., "Managing Resource Consumption and Load in Service Fabric with Metrics", Retrieved from: https://web.archive.org/web/20200527212248/https://docs.microsoft.com/en-us/azure/service-fabric/service-fabric-cluster-resource-manager-metrics, Aug. 18, 2017, 15 Pages.

(56) References Cited

OTHER PUBLICATIONS

Moeller, et al., "Toto—Benchmarking the Efficiency of a Cloud Service", in Proceedings of the International Conference on Management of Data, Jun. 20, 2021, pp. 2543-2556.
Muller, et al., "Lambada: Interactive Data Analytics on Cold Data Using Serverless Cloud Infrastructure", in Proceedings of ACM SIGMOD International Conference on Management of Data, Jun. 14, 2020, pp. 115-130.
Narasayya, et al., "Sharing Buffer Pool Memory in Multi-Tenant Relational Database-as-a-Service", in Proceedings of the VLDB Endowment, vol. 8, Issue 7, Feb. 1, 2015, pp. 726-737.
Narasayya, et al., "SQLVM: Performance Isolation in Multi-Tenant Relational Database-as-a-Service", in Proceedings of 6th Biennial Conference on Innovative Data Systems Research, Jan. 6, 2013, 9 Pages.
Park, et al., "Database Learning: Toward a Database that Becomes Smarter Every Time", in Proceedings of ACM International Conference on Management of Data, May 14, 2017, pp. 587-602.
Parzen, Emanuel, "On Estimation of a Probability Density Function and Mode", in Journal of the Annals of Mathematical Statistics, vol. 33, Issue 3, Sep. 1962, pp. 1065-1076.
Pelkonen, et al., "Gorilla: A Fast, Scalable, In-Memory Time Series Database", in Proceedings of the VLDB Endowment, vol. 8, Issue 12, Aug. 31, 2015, pp. 1816-1827.
Perron, et al., "Starling: A Scalable Query Engine on Cloud Functions", in Proceedings of ACM SIGMOD International Conference on Management of Data, Jun. 14, 2020, pp. 131-141.
Picado, et al., "Survivability of Cloud Databases—Factors and Prediction", in Proceedings of International Conference on Management of Data, Jun. 10, 2018, pp. 811-823.
Pinheiro, et al., "Failure Trends in a Large Disk Drive Population", in Proceedings of 5th USENIX Conference on File and Storage Technologies, 2007, pp. 17-28.
Polyzotis, et al., "Data Management Challenges in Production Machine Learning", in Proceedings of ACM International Conference on Management of Data, May 14, 2017, pp. 1723-1726.
Walck, Christian, "Hand-Book on Statistical Distributions for Experimentalists", in Internal Report of Stockholm University, Sep. 10, 2007, 202 Pages.
Poppe, et al., "Seagull: An Infrastructure for Load Prediction and Optimized Resource Allocation", in the repository of arXiv:2009.12922v1, Sep. 27, 2020, 27 Pages.
Roy, et al., "Efficient Autoscaling in the Cloud Using Predictive Models for Workload Forecasting", in Proceedings of IEEE 4th International Conference on Cloud Computing, Jul. 4, 2011, pp. 500-507.
Sakoe, et al., "Dynamic Programming Algorithm Optimization for Spoken Word Recognition", in Journal of IEEE Transactions on Acoustics, Speech, and Signal Processing, vol. 26, Issue 1, Feb. 1978, pp. 43-49.
Salvador, et al., "Toward Accurate Dynamic Time Warping in Linear Time and Space", in Journal of Intelligent Data Analysis, vol. 11, Issue 5, Oct. 10, 2007.
Shumway, et al., "Time Series Analysis and Its Applications", in Publication of Springer, 2017.
Shyamsundar, et al., "Elastic Pools help you Manage and Scale Multiple Databases in Azure SQL Database", Retrieved from: https://web.archive.org/web/20200718175822/https://docs.microsoft.com/en-us/azure/azure-sql/database/elastic-pool-overview, Apr. 9, 2020, 12 Pages.
Taft, et al., "STeP: Scalable Tenant Placement for Managing Database-as-a-Service Deployments", in Proceedings of Seventh ACM Symposium on Cloud Computing, Oct. 5, 2016, pp. 388-400.
Tran, et al., "Hourly Server Workload Forecasting up to 168 Hours ahead using Seasonal ARIMA Model", in Proceedings of IEEE International Conference on Industrial Technology, Mar. 19, 2012, pp. 1127-1131.
Verbitski, et al., "Amazon Aurora: On Avoiding Distributed Consensus for I/Os, Commits, and Membership Changes", in Proceedings of International Conference on Management of Data, Jun. 10, 2018, pp. 789-796.
Viswanathan, et al., "Predictive Provisioning: Efficiently Anticipating Usage in Azure SQL Database", in Proceedings of IEEE 33rd International Conference on Data Engineering, Apr. 22, 2017, pp. 1111-1116.
Zhang, et al., "An End-to-End Automatic Cloud Database Tuning System Using Deep Reinforcement Learning", in Proceedings of International Conference on Management of Data, Jun. 30, 2019, pp. 415-432.
"International Search Report and Written Opinion Issued in PCT Application No. PCT/US22/046636", dated Jan. 13, 2023, 10 Pages.
Weidendorfer, Josef, "Simulation Driven Performance Analysis for Software Optimization", in Doctoral Dissertation Submitted to Technische Universitat Munchen, May 3, 2016, 137 Pages.

* cited by examiner

DATABASE SIMULATION MODELING FRAMEWORK

CROSS-REFERENCE TO RELATED APPLICATIONS

This application is related to U.S. patent application Ser. No. 16/910,956, entitled "CLOUD LOAD ORCHESTRATOR," which was filed on Jun. 24, 2020 and is incorporated herein by reference in its entirety.

BACKGROUND

Managed cloud database systems operate cloud scale database services that run on machines and clusters in globally distributed datacenters. To manage databases inside a cluster, cloud database services (e.g., Microsoft® Azure® SQL Database) may employ an orchestration system (e.g., Microsoft® Azure® Service Fabric, Google's Kubernetes®, etc.). The orchestration system performs database placement, failover, defragmentation, and other types of operations on databases in clusters. Additionally, the orchestration system may automatically load balance databases across a set of machines (e.g., nodes) in a cluster. To achieve uniform load balancing, each database (or more generally, each application, pod, container, or resource) may report its "load" to the orchestration system for a given set of metrics. Many types of metrics may be defined, but often, central processing unit (CPU) utilization, memory utilization, and disk usage are reported. Each machine in a cluster (i.e., in a ring) has an associated capacity for each metric. The orchestration system will place applications on machines in which the reported application metric load does not violate the machine's metric capacities. In this manner, each application may receive its requested resources.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Testing methods, systems, and computer program products are provided for creating a resource management testing environment. The system comprises one or more processors and one or more memory devices that store program code to be executed by the one or more processors. The program code comprises an initial database (DB) population generator configured to establish a model-defined initial population of databases in a database ring of a database system. The model-defined initial population of databases comprises a model-defined count of databases and model-defined proportions of different types of databases based on output of an initial database population model. A DB population-change generator is configured to generate a model-defined sequence of database population-change events that are used to change the population of the databases over time in the database ring based on output of a database population-change events model. An orchestration framework is configured to perform a test of resource management in the database system based on the model-defined initial population of databases and the model-defined populations of databases changed over time based on the output of the database population-change events model.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
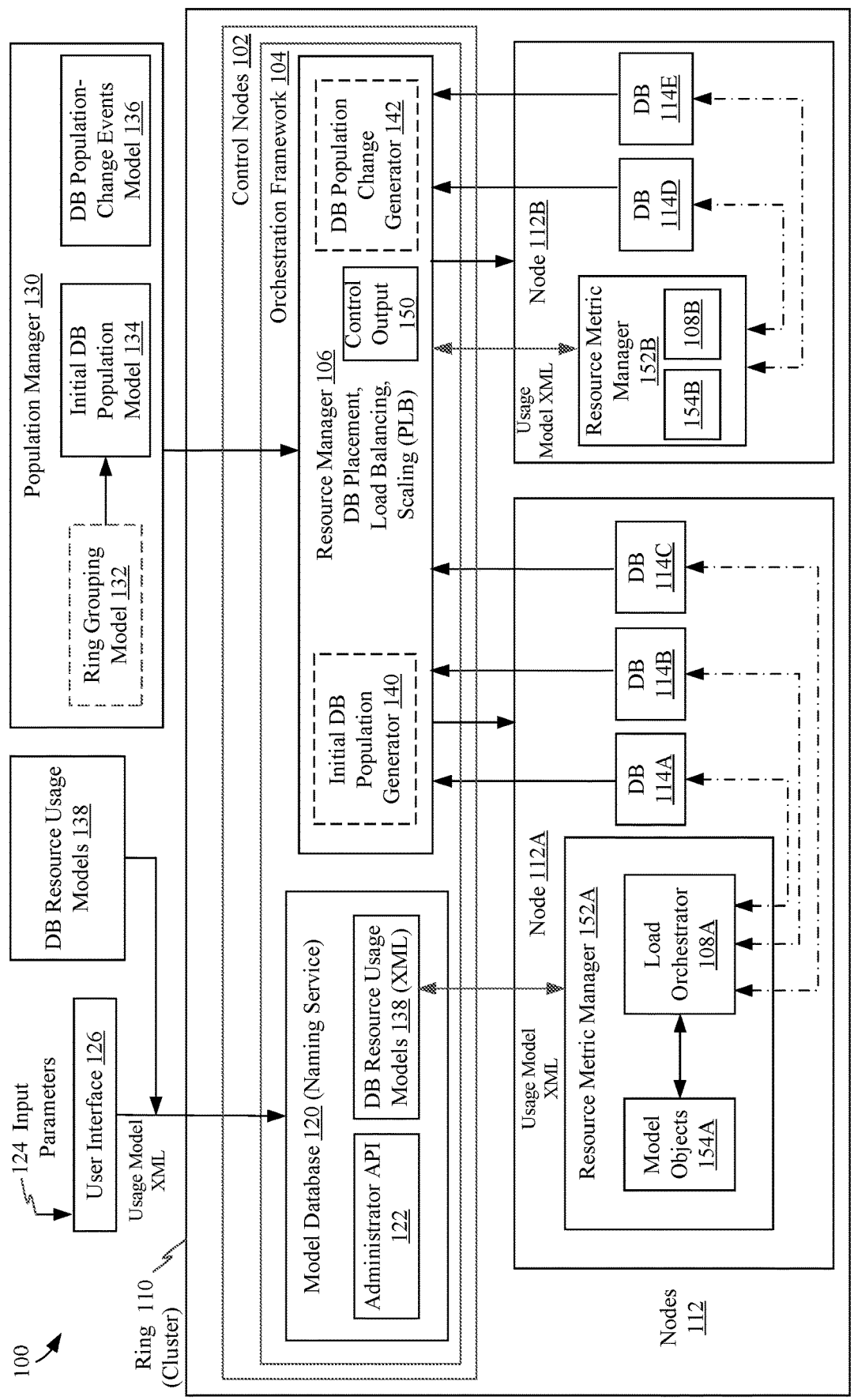
FIG. 1 is a block diagram of a node level system comprising components of a benchmarking system and a database simulation modeling system, according to an example embodiment

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud database services may comprise an orchestration framework for managing databases (or other types of applications) inside a ring (i.e., a cluster), or in multiple rings. As used herein, the terms "ring" and "cluster" may be utilized interchangeably and each term refers to a plurality of commonly-managed physical and/or virtual machines. Each machine in a ring may be referred to as a "node." The term database may refer to an SQL database or any other type of database. While reference is made herein to databases, it is to be understood that the concepts described herein are applicable to other types of applications or resources (e.g., websites, video streaming engines, etc.). An orchestration framework is a system that automates the deployment and management of databases (or other types of applications) as a resource in a cloud system. The databases are instantiated inside nodes of a ring. The orchestration system may perform database placement, load balancing, scaling, failover, defragmentation, and other types of operations on a ring, node, or databases in a node of a ring. In one example, a failover may occur when a load metric, such as a disk usage metric, exceeds its node capacity. One or more databases on an overloaded node may be selected and moved out of the node, which may cause a period of unavailability of one or more databases. In some embodiments, a database may include a collection of services or containers that work together, and the database may be the unit of placement inside of a ring. The orchestration system may automatically load balance databases across a set of nodes in the ring. To achieve uniform load balancing, each database may report its "load" to the orchestration system in a set of metrics. For example, CPU utilization, memory utilization, disk usage, or other metrics may be reported by the databases to the orchestration system. The orchestration system may perform database placement, load balancing, and/or scaling operations based on the reported metrics. Each node in a ring may have an associated capacity for each metric. In order to distribute databases across the nodes, the orchestration system may place databases on nodes where a database's reported metric load does not violate the node's metric capacities.

To improve efficiency of ring operations and minimize cost of goods sold (COGS), a managed database system may operate rings at high utilization. For example, configuration and algorithmic changes may be made to the placement and load balancing strategies of an orchestration system to operate clusters at high utilization. Increasing the cluster utilization may be good for COGS, but may be dangerous for system performance, and it may be customer impacting when there are unexpected usage spikes.

Efforts to increase the efficiency of a database system, such as a managed cloud database that runs on a cloud computing platform (e.g., Microsoft® Azure® Structure Query Language (SQL) Database (DB)), may include attempting to improve (e.g., maximize) the number of databases that can be hosted in a ring. However, resource contention among customer resources may increase when changing the configurations, policies, and features that control database co-location on ring nodes. Tuning and evaluating the efficiency and customer impact of these variables in a scientific manner, in a dynamic production system with a customer workload, may be difficult or infeasible.

A benchmark system is provided for evaluating the efficiency of a cloud service, which leverages an orchestrator system (e.g., Microsoft® Azure® Service Fabric or Google's Kubernetes®). The benchmark system allows for reliable and repeatable specification of a benchmarking scenario of arbitrary scale, complexity, and time-length. An implementation of the benchmark system may be deployed within SQL DB staging clusters and may be utilized to evaluate system efficiency and behaviors. In some embodiments, the benchmarking system may be utilized to find a desired density level given an initial population of databases at a specific resource utilization. In some embodiments, an optimal density for a database ring may be driven by a workload behavior of each database and overall resource utilization of the ring. Rings with lower disk utilization may be good candidates for increased density (e.g., assuming they are not constrained by other resources). There may also be efficiency opportunities at the individual database level. Mechanisms for resource governance (and performance control) exposed by a database engine may be available to a load orchestrator (described in more detail below) to facilitate efficient resource usage and reduce failovers.

Also described herein is a database simulation modeling system, which may be referred to as a modeling framework. As described above, a large cloud service such as an SQL DB cloud service may update its services over time to better meet the needs of its customers. Before rolling out new changes to production clusters (e.g. in configurations, policies, features, etc.), an evaluation of a stage ring may be performed. The stage ring's functionality and effects may be closely monitored and analyzed to reduce or minimize negative impact on customers. To promote fair and robust evaluations, production-like environments of stage rings may be generated repeatedly. This task may be challenging for two reasons, namely, the complex and dynamic nature of database production workloads, and the prohibitively high cost of driving real production SQL database workloads at scale. There are many database activities that can happen at the node level and ring level, including but not limited to, database creation, database restore, database drop, and database failover. In addition, customers' workloads change over time and reported resource usage metrics may not be consistent. To better mimic a production environment in a stage ring at scale and/or within an acceptable cost level, in some embodiments, the benchmarking system may be utilized with the database simulation modeling system to generate production representative scenarios at database, node, and ring levels. For example, the modeling system may be used together with a load orchestrator to simulate SQL DB ring activities and resource utilizations using a realistic dynamic database population model and a realistic SQL workload imitation. This type of system may be utilized as a stage ring testing tool to evaluate the impact of new features in the database system. For example, the load orchestrator may be used together with the modeling system to evaluate various overbooking ratios (described in more detail below).

The database simulation modeling system may be operable to reproduce a wide variety of database events and activities at a ring level. Also, it may be easily scaled and generalized to simulate database activities at node level and/or region level. From a high level, the modeling system comprises four types of models including:

(i) A ring grouping model (or ring classification model): this model groups rings into different classes based on resource utilization levels defined by the ring grouping model. This model is trained based on production system resource utilization levels. Output from this model indicates resource usage of rings for classification and grouping of the rings based on threshold values (e.g. a ring may be classified as using a high level of disk space and as having a low number of compute cores). This classification information may be used in the initial database population model to bootstrap parameters. In order to start a load orchestrator experiment a database ring may be initialized with user configuration input indicating which ring class to target or select for the test (e.g., test for a high memory utilization ring class).

(ii) An initial database population model automatically generates a population of databases for each ring group based on user-defined parameters and output from the ring grouping model. It may determine associated service level objectives and resource metrics for each database of the population. The distribution of database editions (i.e., local vs remote database storage), service level objectives (SLOs) (i.e., available resources such as disk space, memory, compute cores, etc.), and resource usage levels are determined based on the targeted ring group. A reusable tool may be used to generate the initial population directly. The tool can target both an empty ring or non-empty ring.

(iii) Individual database resource usage models that generate resource usage metrics. Example resource usage metrics include disk space usage, memory usage, compute resource usage (e.g., central processing unit (CPU) usage for each individual database over a specified amount of time (e.g., for every x minutes)). These models may model SQL DB resource usage behaviors that fluctuate around a given range as well as exhibit sudden usage spikes (e.g., "outlier" patterns), and (iv) A database population-change events model (also referred to as the database create and drop events model) simulates the number of databases to be created and/or dropped within a time period (e.g., in each hour). Once database create and drop numbers (i.e., counts) are determined, the model may also select the specific database types to be created or dropped. In one example, for each time period, a normal distribution may be used to simulate the number of creates and drops (truncated at 0 and rounded to nearest integer). The model may be trained using production system telemetry, including database create and drop events of a production database system.

Since the models are composable, depending on the target application (e.g., database, website, streaming service, etc.), the models can be used individually or collectively. The modeling system may be used together with the load orchestrator to simulate, for example, SQL DB ring activities and resource utilizations, thereby providing a realistic dynamic database population model and a realistic SQL DB workload imitation. It can be used as stage ring (i.e., stagged cluster) testing tool to evaluate the impact of new features (e.g., to evaluate various overbooking ratios).

The ring grouping model may perform ad-hoc analysis on ring resource usage levels, roll out new features to a particular ring group type (e.g., a high disk usage and low number of compute cores). For example, at a higher level, an inter-tenant ring load balancer that may choose a ring for placement, and effectively perform database population shaping per ring. An inter-tenant ring refers to a ring shared by multiple tenants (e.g., users or customers). Ring grouping models output the types of database population demographics currently in a ring, and also, the effectiveness of inter-tenant ring decision makers, should they employ certain policies. The initial population model and the individual database resource usage models may be utilized for various testing scenarios. For example, to test SQL database resiliency to a large scale outage among other things.

1. Introductory Summary

In managed cloud-based database systems, efforts to increase efficiency of a database service may include increasing (e.g., maximizing) the number of customer databases that can be hosted on a fixed-size ring of servers. The desire for improved efficiency may be driven based on cost reduction, availability of hardware, etc. In some embodiments, databases may be placed in rings based on a fixed capex cost.

In one example system, the operating density of cloud-based databases in a database ring may be directly tied to the degree of database underutilization. In complex systems such as a cloud SQL database system, there are numerous parameters, policy thresholds, and improvement features that can impact the number of databases that can co-exist on a node in a ring while maintaining a high quality of service (QoS). A service provider may strive to accurately and reliably evaluate the effect of different policies and mechanisms based on the degree of database density in the ring while concurrently measuring the effect on the QoS. The benchmark system provided herein may help to reveal the impact of such policies and/or mechanisms on a cloud service system.

A service provider may seek a way to compare the effects of a change (e.g., change of a tuning parameter) in a scientific manner that is reliable, repeatable, and representative of effects that would occur in a production environment. To evaluate a change in a cloud database system or service, either two comparable rings running side-by-side may be evaluated, or a single ring with comparisons of before-and-after key performance indicators (KPIs) may be evaluated. In some embodiments, the granularity of deploying changes in an SQL database may occur at a ring (i.e., cluster) level. For example, for a fair evaluation, replication of database population ratios, database properties (e.g., size), database workloads, and the system itself (e.g., deployed features and hotfixes) may be implemented. It may be difficult (e.g., impossible or cost prohibitive) to control such variables without negatively impacting the customer experience. Consequently, the benchmark system with the database simulation modeling system is provided as a cloud service framework whereby the code base may be deployed and evaluated in a manner that avoids negative customer impact. This cloud service framework may be part of an active, day-to-day effort to increase efficiency within SQL database cloud systems and services. The benchmark system may be utilized to: (i) evaluate production configuration changes in SQL databases before they deploy (e.g., buffers, placement policies), (ii) quantify the benefits of proposals (e.g., what-if scenarios), and (iii) debug (i.e., "repro") problems from production rings.

The example benchmarking system described herein focuses on benchmarking a single staging ring by focusing on node-level systems that govern the resources and performance of database engines and a ring orchestration system. For reference, SQL database regions (e.g., of one or more datacenters) may be made up of hundreds of rings. FIG. 1 is a block diagram showing a node level system 100 comprising a benchmarking system and a database simulation modeling system, according to an example embodiment. As shown in FIG. 1, system 100 includes a ring 110, a user interface 126, and a population manager 130. Ring 110 comprises one or more control nodes 102 (i.e. nodes 102) and one or more data nodes 112 (i.e., nodes 112). The one or more control nodes 102 comprise an orchestration framework 104. Orchestration framework 104 comprises a model database 120 and a resource manager 106. Model database 120 comprises an administrator application programming interface (API) 122 and a database resource usage model 138. Resource manager 106 comprises initial database population generator 140 and database population-change generator 142. Nodes 112 may comprise data node 112A and data node 112B (i.e., node 112A and node 112B). Data node 112A comprises a resource metric manager 152A, a database 114A, a database 114B, and a database 114C. Resource metric manager 152A comprises model objects 154A and load orchestrator 108A. Data node 112B comprises resource metric manager 152B, a database 114D, a database 114E, model objects 154B, and a load orchestrator 108B. Population manager 130 comprises a ring grouping model 132, an initial database population model 134, and a database population-change events model 136. Also shown in FIG. 1 are database resource usage models 138, user input parameters 124, and a control output 150.

Orchestration framework 104 may also be referred to as orchestration system 104. Ring 110 may also be referred to as cluster 110. Data node 112A and data node 112B may also be referred to as node 112A and node 112B respectively, or data nodes 112 collectively. Database 114A, database 114B, database 114C, database 114D, and database 114E may also be referred to as databases (DBs) 114A-114E. Databases 114A-114E also may also be referred to as applications 114A-114E. Database population-change events model 136 may also be referred to as database create and database drop events model 136. Model database 120 may also be referred to as a naming service. Resource manager 106 may also be referred to as placement, load balancing, and scaling (PLB) 106.

Control nodes 102 may comprise a plurality of nodes that may be communicatively coupled to data nodes 112. In some embodiments, each of the control nodes 102 and each of data nodes 112 (e.g., data node 112A and data node 112B) may comprise a separate computing device (e.g., a server computer) or a separate virtual machine that may be instantiated in one or more computing devices.

As described above, ring 110 includes data nodes 112A-112B. In some embodiments, the data nodes of ring 110 may be configured to act as a single system. Various types of systems may be represented by ring 110. For example, ring 110 may comprise an SQL database system with databases 114A-114E. Alternatively or in addition, ring 110 may comprise another type of system such as a website, a real time stream processing engine, a web-based document management system, or a storage system, comprising other types of applications 114A-114E, and the functions described herein may be applied to the other types of applications (other than database applications). In some embodiments, databases 114A-114E are configured to communicate with each other and collaborate to perform a set operations. In some embodiments, databases 114A-114E comprise a collection of services or containers that work together. Each service or container may include code and its dependencies in an independent and self-contained unit.

Orchestration framework 104 may be a system that is configured to perform various operations to dynamically deploy and manage databases in ring 110. For example, resource manager 106 may be a component of orchestration framework 104, and may be configured to instantiate databases, such as databases 114A-114E, inside nodes 112A-112B and/or additional data nodes (not shown) in cluster 110 or in another cluster. Resource manager 106 is also configured to automatically manage workloads executed in ring 110 by placing databases in nodes 112A-112B (and/or additional data nodes in ring 110), performing load balancing across nodes 112A-112B (and/or additional data nodes in ring 110), scaling node capacity up or down based on load, performing failover to one or more databases when an instantiated database becomes unavailable, defragmenting data (e.g., reorganizing indexes according to the physical order of data), and/or performing other types of operations in ring 110. A database, such as one of databases 114A-114E, may be considered the unit of placement inside ring 110. Orchestration framework 104 may also be configured to facilitate testing of orchestration (e.g., PLB) operations. Model database 120 may comprise a highly available metastore database for orchestration framework 104, which may store resource usage model information and may communicate resource usage information to nodes 112 for use in the testing processes.

Population manager 130, including ring grouping model 132, initial database population model 134, and database population-change events model 136, as well as DB resource usage models 138, are executed outside of ring 110. Ring grouping model 132 may be configured to define and classify rings that may be utilized in a staged system (or a partitioned portion of a production system) used for testing of system orchestration operations and efficiency. Initial database population model 134 may be utilized to determine databases for placing an initial database population in a ring for testing purposes, and database population-change events model 136 may be utilized to create and drop databases over time to mimic the behavior of a production system. When a model determined database (e.g., database 114A) is to be placed in a ring and/or node for testing purposes, population manager 130 is configured to contact initial database population generator 140 and database population-change generator 142 of resource manager 106 in control nodes 102 for deploying the databases.

Each of databases 114A-114E may be configured to report various "load" metrics to resource manager 106. For example, the load metrics may include CPU utilization, memory allocation, disk usage, and/or any other suitable metrics. Each node 112 in ring 110 has an associated capacity for each reported metric. In order to distribute databases evenly across nodes 112A-112B (and/or additional nodes in ring 110 or another ring), resource manager 106 may place databases on nodes where the databases' reported metric loads do not violate their metric capacities. Although FIG. 1 shows two data nodes (112A-112B), with five databases (114A-114E), ring 110 may include more or fewer data nodes and more or fewer databases. Furthermore, the number of databases active in ring 110, or in any of the nodes 112, may vary dynamically over time, for example, based on the demand for greater or fewer resources. Moreover, although only one ring 110 is shown in FIG. 1, orchestration framework 104 and/or resource manager 106 may manage additional rings.

Control nodes 102 comprising orchestration framework 104 may be instantiated in one or more computing device(s) and may be configured to automatically perform server configuration and management operations with respect to one or more rings such as ring 110 and one or more data nodes such as data nodes 112A-112B. Orchestration framework 104 is not limited to any specific type of orchestration system, and may comprise any suitable orchestration system.

Resource metric managers 152A and 152B may respectively comprise load orchestrator 108A and load orchestrator 108B. In general, load orchestrators 108A and 108B may each be configured to facilitate a process for testing the behavior of resource manager 106. Load orchestrators 108A and 108B may each receive respective artificial (or imitation) workload metrics that are generated based on database resource usage models 138. Database resource usage models 138 may be trained based on actual workload measurements of one or more live production rings. In general, the artificial metrics may be defined as any arbitrary real or meta metrics (e.g., a physical metric, a logical metric, etc.). For example, the artificial metrics may comprise values representing CPU usage, memory usage, and/or disk usage. In some embodiments, load orchestrators 108A and 108B may receive one or more requests from a database of databases 114A-114C and 114D-114E respectively, for metric values to report to resource manager 106. In response, load orchestrators 108A and 108B are configured to transmit artificial metric values to the requesting database. The databases 114A-114C and 114D-114E may transmit their respective artificial metric values to resource manager 106. Resource manager 106 is configured to receive the one or more artificial metric values and respond as if the artificial metric values were metrics reported based in an actual workload occurring in databases 114A-114E. For example, in response to receiving the artificial metric values, resource manager 106 may generate a control output 150 that indicates one or more resource manager 106 operations (i.e., PLB operations), and then perform these operations in ring 110 or another ring. The operations may include but are not limited to database placement, load balancing, scaling, failover, defragmentation, or other types of ring and node operations.

In general, resource manager 106 may execute algorithms and may be configured so as to perform these operations according to various strategies. The algorithms and configuration parameters may be tuned or replaced to improve resource management PLB functionality, and in turn improve the performance of databases and ring nodes running in system 100 (e.g., for higher utilization, speed, reliability, etc.). Such performance improvements often lead to cost savings. For example, the number of resources needed to complete a task may be reduced by improving resource management functionality and thereby improve resource usage efficiency. In other words, database operation performance (or any other application performance) may be improved by improving the functionality of resource manager 106. The functionality of resource manager 106 may be further tested utilizing control output 150 of resource manager 106. In some embodiments, control output 150 may be stored, analyzed, and/or displayed via user interface 126. In this manner, actions that would be performed by resource manager 106 in response to a workload similar to the load defined by the artificial metrics may be tested and observed. The benchmarking system of system 100 enables a realistic re-creation and staging of complex problematic ring-wide scenarios, such as correlated spikes in resource usage, and allows for the ability test the functionality of resource manager 106 in such scenarios. For example, control output 150 may indicate how resource manager 106 would function utilizing a new placement algorithm in comparison to an old placement algorithm when running thousands of databases. In this manner, developers may load-test resource manager 106 to understand the behavior of the system under a specified expected load. Resource manager 106 may be configured perform the PLB operations indicated in control output 150 (for testing purposes) such as performing database placement, load balancing, scaling, failover, defragmentation, or other types of operations in ring 110 and/or data nodes 112A-112B.

Administrator API 122 in control nodes 102 may be called by a user via user interface 126, or during ring 110 boot, to write a serialized representation of database resource usage model 138 in extensible markup language (XML) to model database 120. Resource metric manager 152A and/or resource metric manager 152B may read model XML data from model database 120, parse the model XML, and construct model objects 154A and 154B respectively for generation of the artificial metrics. For example, when one or more of databases 114A-114C and/or 114D-114E are to report their artificial metrics to resource manager 106, each database 114 issues a remote procedure call (RPC) call to its respective resource metric manager 152A or 152B. The respective resource manager consults its respective model objects 154A or 154B and computes or determines the artificial metric values and returns respective artificial metric values to the calling database. In response to receiving the artificial metric values, databases 114 transmit their respective artificial metric values to resource manager 106, which generates control output 150 and performs PLB operations based on the artificial metric values. User interface 126 may also be configured to receive user input parameters 124 for configuring other aspects of testing resource manager 106 PLB operations, for example, configuring models (e.g., initial database population model 134) and/or target attributes of a stage ring for testing purposes, or to indicate which resources (e.g., databases 114A-114E), nodes (e.g., nodes 112A-112B), and/or rings (e.g., ring 110 and/or other rings), are to receive artificial metrics. In some embodiments, user interface 126 may be configured to receive control output 150 from resource manager 106 or orchestration framework 104 and format control output 150 for display and/or analysis via user interface 126. In some embodiments, resource manager 152A and/or 152B may write the artificial metric values that were computed or determined for databases 114 to model database 120 in order to preserve state of the databases in case of database failover events.

DB resource usage model 138, ring grouping model 132, initial database population model 134, and/or database population-change events model 136 may be created by off-line or backend processes relative to control nodes 102 and/or data nodes 112 (e.g., on remote computing device(s) relative to the computing device(s) running control nodes 102 and/or data nodes 112). Ring grouping model 132 functions may be performed by population manager 130, or may be performed on a different computing device or virtual instance. Ring grouping model 132 and initial database population model 134 may be configured to determine characteristics of, and a count of, rings and databases for establishing a staged testing environment, or at least establishing a portion of rings and/or databases that may be partitioned for testing purposes in a production cloud database system. Database population-change events model 136 may be utilized to determine database additions or drops in the population of databases 114 in data nodes 112. DB resource usage models 138 may be utilized to determine the artificial metrics utilized for testing and reported by the population of databases 114 as the database population changes over time. Database resource usage model 138, ring grouping model 132, initial database population model 134, and/or database population-change events model 136 are described in more detail below.

In some embodiments, an SQL database region (or datacenter) may be made up of hundreds of data rings similar to ring 110. In this environment, benchmarking a database service for efficiency may be less focused on the capabilities of a database query optimizer or processing engine, but rather, may be focused on how well the resource manager and orchestration framework can (i) control the resources provided to database engines (e.g., databases 114), and (ii) effectively collocate databases, respectively. Therefore, the benchmarking system may, for example, strive to present thousands of SQL database "workloads" to these two systems so that they react to improve (e.g., maximize) ring efficiency.

The benchmarking system workloads may not utilize SQL database query workloads or traditional relational database management systems (RDBMS) performance benchmarks for multiple reasons. In this regard, customer databases generally do not exhibit full-bore performance workloads such as transaction processing council benchmarking (TPC-E/H), but rather, may have low utilization, burstiness, or be idle (which is where an efficiency opportunity may be derived). Secondly, it is advantageous to avoid reverse engineering SQL database workloads based on observed utilization traces in the hopes that utilization traces can be recreated. Cloud service providers may not have access to customer queries or data details. Finally, it is advantageous to avoid the complexity and the cost of relying on SQL database drivers that may be coordinated and hosted on sufficient compute power.

One function of a database engine (e.g., databases 114) is to transform SQL queries into resource requests to be consumed by a resource metric manager and orchestration system such as orchestration framework 104. The mechanism provided for reporting "artificial" resource loads may be applicable to any container orchestration system that manages custom defined resources. One job of resource metric manager 152A and 152B, and orchestration framework 104 is to manage the database engine instances (e.g., databases 114) and ring nodes (e.g., data nodes 112) based on these resource load signals (artificial metrics). This is a distinction between the benchmarking system described herein and component simulators. The benchmarking system described herein reveals full-stack impact and utilizes production-derived models of database resource consumption and customer behavior (e.g., data description language (DDL)) and produces request streams on behalf of the database engine instances. Other important model information for SQL databases includes the service tier (e.g., remote versus local database storage) and SLO configuration options of the database population. A SLO may comprise the configuration of software and/or hardware resources available in the SQL database system, such as the number of, performance of, and/or size (i.e., capacity) of various resources such as compute cores, memory (e.g., DRAM), disk space, etc. Given that system 100 aims to benchmark efficiency, the temporal richness of the modeling matters as well as amplitude of the signals. For example, business hours and week days may be treated differently than evenings or weekends. System 100 may consume declaratively specified models and parameters, allowing an easily (re) specified benchmark scenario of arbitrary scale, complexity, and time-length, and may target any suitable database ring.

To demonstrate service efficiency evaluation, a density tuning study of an SQL database stage ring was performed using models of production databases and customer behavior. If a ring's density is tuned high enough, a provider may begin to face significant challenges. In this example, different SQL database offerings (e.g., a serverless database) and SLO configurations (e.g., resources configurations) may have distinct CPU capacity (e.g., maximum available CPU cores) and disk quotas. A node at high density may risk a scenario where if all of the databases on the node consumed their actual quota limit of a resource like disk, the node may not have the disk capacity to dispatch a given request. If a node in the ring hits its logical capacity limits (also a tunable parameter) due to resource consumption by the databases placed on it, then one or more of the databases will be moved to another node (thereby suffering a failover). This may cause a moment of unavailability and varying performance levels. It is the job of the system to intelligently manage the likelihood of failovers happening on any node through placement, resource governance, and balancing. Results from the study show the balance between database density on the ring, a quantification of failovers, and the modeled "adjusted" revenue. The notion of adjusted revenue provides a means to normalize density and failovers. A single parameter was tuned in a real SQL database stage ring which enabled or controlled the degree of allowable database density. Using the benchmarking system, this was evaluated using a specific benchmark scenario that models rings in a particular region of a cloud database system. Results indicated that more databases can be admitted into the ring over a given setting. Depending on the density level and database demographics (e.g., database edition and performance configuration), different resources may become the bottleneck for the ring.

Provided herein is a public-cloud production-oriented benchmarking system that allows for declarative benchmark submission defined by different models of customer and workload behavior to reliably and repeatably evaluate different service settings and configurations. This system can be applied to any suitable cloud infrastructure that is built upon orchestrators (e.g., Microsoft® Azure® Service Fabric or Google's Kubernetes®). An implementation of this system may be integrated into the resource governance component of an SQL database (e.g., Microsoft® Azure® SQL DB) and provides a means to benchmark the efficiency of an SQL database.

2. Technology Overview

Rings and SKUs: In an example cloud database system, the system may run numerous regions worldwide (e.g., 55 regions). Each region may be thought of as one or more physical datacenters and each datacenter may house hundreds to thousands of rings (or clusters) of nodes. Different database services such as SQL database, may occupy different rings (while some may share rings). SQL DB database rings may vary in their size, but for example, may range between having 50 to 150 nodes. SQL database rings can also be considered homogeneous in their hardware stockkeeping unit (SKU), such as a hardware generation SKU. Different hardware generations may differ in their compute (CPU), memory, local storage, and networking power. Importantly, they may vary in their different resource ratios. For instance, the ratio of CPU cores to memory or the memory to local storage ratio may be different from one generation to another generation (e.g., as the prices of different commodity components change over time). Resource ratios may play a large role in determining the efficiency of SQL database rings as it should be in alignment with the customer's database resource demands. Otherwise, unused resources may be "stranded" and efficiency may suffer. A ring may comprise one or more data nodes and may be referred to as a tenant ring. A data node may host one or more SQL databases.

SQL DB Editions (i.e., service tiers): Categorizing SQL databases and their configurations may be done first according to where the data is stored. Remote-store databases may include editions (also referred to as service tiers) like "standard data transaction unit (DTU)" and "general purpose virtual core (VCore)" (i.e., general purpose (GP) edition). Databases in these editions may have their SQL data and log files stored remotely from the compute node. Local-store databases include editions like "Premium DTU" and "Business Critical VCore" (BC), and their database files may be stored on compute-node-local solid state drives (SSDs). For redundancy, these local-store databases may be replicated (e.g., four times on four different compute nodes). The service level objectives (SLOs) in each edition and hardware SKU may have different configurations, such as the amount of compute units (cores) or the amount of dynamic random access memory (DRAM) available to the SQL database process. The performance of query processing on local-store databases may outpace that of similarly configured remote-store databases, but from a provider perspective, it may come at a higher cost (and revenue) due to local SSD and replication. In one example, a remote-storage database (i.e. general purpose (GP) edition/service tier database) may be utilized for most business workloads. A GP database may offer budget-oriented, balanced, and scalable compute and storage options and have one replica. In another example, a local-storage database (i.e., business critical (BC) edition/ service tier database) may offer business applications higher resilience to failures by using several isolated replicas, and provide higher input/output (I/O) performance per database replica, with three replicas, one read-scale replica, and zone-redundant high availability (HA).

Resources: While an SQL database engine (e.g., databases 114) processes transaction SQL (T-SQL) queries, the rest of the SQL database infrastructure stack (e.g., control nodes) may only be concerned with the resources the database engine is consuming and releasing. In addition to the core database management system (DBMS) SQL engine, a cloud based SQL database system contains components that manage the resource governance of the SQL database engines. In one example, the main resources under consideration include CPU consumption, DRAM consumption, and disk consumption for data storage. While CPU and memory resources may be understood in a straight forward fashion, an understanding of the disk resource may be more nuanced, especially considering the SQL database editions described above. For the SQL database infrastructure, the local disk capacity consumption is highly important because it may not be transiently consumed. Further, the local storage configurations (e.g., premium or BC) virtual core (VCore) databases may have a high capacity (e.g., maximum allowable capacity), which consumes a significant fraction of a single machine. For local-store databases, the disk consumption includes data and log space used, as well as temporary database (i.e., tempDB) storage capacity (e.g., spilling to disk during query processing). For remote-store databases, only the tempDB storage may contribute to its local disk resource consumption.

Production Environments: Evaluating any efficiency-oriented changes in a production database system may be very challenging. In some SQL database systems, code and parameter changes are deployed on a ring-by-ring basis. For a change to be evaluated, either a before-and-after analysis would be performed on a single ring, or a side-by-side A/B test would be performed on two rings. A before-and-after analysis on a single ring is not considered practical, as database population demographics on a ring may change over time, and the databases themselves may generally grow over time as well. In a before-and-after production analysis, the production ring cannot be "rewound" back to a starting state, though this is essentially what is achieved with the disclosed benchmarking system. Moreover, identifying two similar rings for side-by-side evaluation of a change is non-trivial, if not as impractical as a before-and-after evaluation. For instance, there may be distinct regional differences in workloads, edition, and/or SLO demographics. However, considering a large percentage of local-store databases over a region, it may be possible to find two rings with similar database "demographics." Even so, during a side-by-side evaluation, these two rings would need to exhibit the same workload/growth behavior as well as have similar database create assignments (and drops). Evaluation in this way is also, practically prohibitive.

Representing Workloads: Many databases in the public cloud have low utilization levels and do not exhibit the resource consumption behavior of that utilized in running full-bore transaction processing performance council (TPC-x) benchmarks. For example, in a cloud database system with a large proportion of databases having low CPU and memory utilization the use of TPC-x benchmarks may be avoided. In the present disclosure, an efficiency benchmarking system for a database service has been designed around resource consumption, in part, because it allows for the use of telemetry data to produce a production-representative load to impose onto the service and ring infrastructure.

Failover: Failovers occur when a load metric (e.g., disk usage) exceeds a node's capacity. One or more databases on an overloaded node may be selected and moved out of the node. The failover may cause a moment of unavailability of selected databases, which may affect customer experience.

3. Building a Benchmark System into SQL Database Infrastructure

In some embodiments, an implementation of the benchmarking system may comprise two components including an orchestration framework (i.e., orchestrator) that may be built into an SQL database's resource governance stack (see Section 3.3.1 below), and a population manager that is configured to call public create, read, update, and delete (CRUD) APIs (Section 3.3.3 below). Together, these two components are "the man behind the curtain," by instructing when new databases should be created, when databases are dropped, and what each database's current (artificial) resource usage levels are. The following sections describe an example SQL DB infrastructure and how the benchmarking system and modeling system may be implemented within it.

3.1 Orchestration Framework System

An SQL database cloud system may run on top of orchestration framework 104 (e.g., Microsoft® Azure® runs on top of Service Fabric (SF)). As a container management system, orchestration framework 104 may comprise a distributed platform for deploying microservices and/or containers. Orchestration framework 104 may be responsible for management of the microservices in ring 110 and/or other rings, and may handle common challenges in cloud deployments such as availability, resource management, application lifecycle, and load balancing. SQL database regions may be broken up into many orchestration system rings, where each ring either hosts control services (i.e., "control rings," or control nodes 102) or data plane services (e.g., "tenant rings," or data nodes 112). When a customer wishes to create a new database, after a ring is chosen, the request is forwarded to the ring's placement and load balancer (PLB) of resource manager 106, which is a component of the orchestration framework 104, to decide the placement and movement of databases such as databases 114. Depending on the replication factor of the microservice (see Section 2), resource manager 106 may distribute database replicas across different nodes 112 in ring 110. Resource manager 106 is responsible for maintaining the availability of single replica databases and multi-replica databases.

In general, orchestration framework 104 may be informed of an application's (e.g., a database 114) load so that it can make smart placement decisions and move replicas when nodes become heavily loaded. PLB operations of resource manager 106 may address this condition utilizing dynamic load metrics. A load metric may be arbitrary and may model any suitable metric. Each replica of the application (e.g., database) may report its load metrics to resource manager 106, where resource manager 106 aggregates a centralized view of the load on each node. For example in an SQL database, each database replica reports the amount of disk space it uses to resource manager 106.

A database replica's metrics may be dynamic as they can change over time. In general, each database replica in a ring may be responsible for reporting to resource manager 106 when its load has changed, or report its load at some regular interval. Each resource metric may have a predefined node-level logical capacity, which specifies a load threshold at which resource manager 106 will initiate a failover. A failover occurs when database replicas' (e.g., databases 114A-114C) aggregate resource demands on a node (node 112A) have exceeded the node's predefined logical capacity. In order to meet resource needs, a database replica may be moved out of a heavily loaded node. Resource manager 106 may select a database replica on the heavily loaded node and move it to another node in the ring. For premium (BC) databases (e.g., having local disk space), a database replica may be built on a new node. This process involves physically copying over data from another available replica, whereas the data for a standard (GP) database (e.g., using remote disk space) can be accessed by detaching and reattaching the remote storage for the database. Furthermore, while a failover to a primary replica is occurring, the application (e.g., database) may experience a brief moment of unavailability while a secondary replica is becoming the primary or a new primary replica is built. In some embodiments, logical resource capacities of each data node may be set conservatively so that each database replica receives their share of each resource. However, as the density of rings increases, the probability that a failover will occur also increases. This may result in failed queries, dropped connections, or failed login attempts. Reducing failovers in SQL database rings is important for a good system performance (and customer experience).

3.2 Resource Metric Manager

An example SQL database system may comprise a helper service deployed for managing resource metrics reported by each database instance to the resource manager 106. For example, a resource metric manager 152 instance may run on each data node such as nodes 112A and 112B, in a ring 110. A resource metric manager 152 instance may have a centralized view of the data node and may be responsible for governing the data node's resources and mitigating potential noisy neighbor performance issues. Each individual database (e.g., each database 114) may report its own load (e.g., resource usage metrics) to resource manager 106. For example, a resource metric manager 152 instance within each data node 112 may provide an internal API for retrieving the load metrics of a database within the same data node. In other words, the database 114 engines communicate with the co-located resource metric manager 152 instance. Referring to FIG. 1 as an example, when database 114A is reporting its metrics (e.g., measured CPU, memory, and disk usage) to resource manager 106, it first consults its resource metric manager 152A issuing a metric request RPC. Resource metric manager 152A does the work to compute and account the database's resources. These values are then returned to database 114A so they can be reported to resource manager 106.

3.3 The Benchmarking System for Evaluating Cloud Service Efficiencies Through Orchestrator's PLB Functionality 3.3.1 Orchestrator. In some embodiments, the benchmarking system may be implemented to leverage an existing SQL database infrastructure by redirecting a database's RPC request for resource usage metrics, to sample from defined models for artificial or imitation resource usage metrics, instead of returning the actual (i.e., measured) resource usage metrics. These models (e.g., database resource usage models 138) may be trained using actual (i.e., measured) SQL database telemetry from a production database system that captures the production system's resource usage behavior (see Section 4). The models may be specified for any suitable type of resource (e.g., CPU, memory, disk usage, etc.) and for any subset(s) of databases, and may be provided as input to the resource metric manager (e.g., resource metric manager 152A and resource metric manager 152B) via an XML blob. FIG. 1 shows an example SQL database system architecture modified to include the benchmarking system's orchestrator.

Database resource usage models 138 and respective parameters trained on the production telemetry may be serialized into XML format and written into model database 120. Model database 120 may comprise a highly available metastore database in orchestration framework 104 and may be used to store metadata about services running in ring 110. In some implementations, resource metric manager 152A and resource metric manager 152B may each read DB resource usage model 138 XML data periodically (e.g., every 15 minutes) from model database 120, parse the model data, and construct internal model objects 154A and 154B respectively, based on the parsed resource usage model 138 XML data. In some embodiments, the model objects 154A and 154B may comprise a description of the resource metrics they are modeling, the set of databases that the metrics apply to (e.g., all remote store databases), and a timing for reporting the artificial resource usage metrics to resource manager 106.

Subsequently, when an SQL database replica (e.g., database 114A) is to report its metric loads to resource manager 106, it may issue an RPC call to its local resource metric manager 152. For example, database 114A may issue an RPC call to resource metric manager 152A. In response, resource metric manager 152A may consult model objects 154A and compute the metric loads (i.e., artificial resource usage metrics or model defined resource usage metrics) that should be reported by database 114A to resource manager 106. If no model exists for a database replica (e.g., a database 114) and/or the load metric that is being reported, the replica's actual load usage may be reported, which may be normal operating behavior for the database. Otherwise, the supplied model objects 154A and 154B will be used for computing the artificial metric values to report to the resource manager 106. Because resource metric managers 152A and/or 152B may be stateless, in some embodiments, the model objects are stateless as well. This allows the model objects 154 to be updated without losing context of how to report the next load metrics. In some embodiments, the logic for sampling from the DB resource usage models 138 XML may be directly coded into resource metric managers 152A and 152B such that sampling is fast and efficient. Building the model execution directly into resource metric managers 152A and 152B allows for declarative and dynamic resource behavior. DB resource usage models 138 may be updated by overwriting the XML in model database 120. Tweaking the growth behavior of subsets of databases (e.g., growing disk usage of premium (BC) database replicas 2× faster) may be easily configurable by changing XML properties. These DB resource usage models 138 may be scalable and can be applied to many databases at once that exhibit similar resource patterns.

3.3.2 Imitating Production Resource Behaviors. The benchmarking system may be implemented to override the resource behavior of specific metrics by consulting model objects 154A and/or 154B constructed from serialized XML. However, in some embodiments, this implementation may not be sufficient to ensure realistic, production-like behavior. This is because, as mentioned above, model objects 154 may be stateless. The model objects may describe how a particular artificial metric's load changes (e.g., how model defined CPU, memory, and/or disk space usage changes), but the model objects may not persistently track previously reported artificial metric values. Without persistently storing the previously reported artificial metric load, on a database failover from one node to another, the newly promoted primary database will not know what the previously reported artificial metric load was (e.g., the new database replica will be communicating with a different resource metric manager 152). For some resources (e.g., memory or CPU), this situation may be the expected behavior and may not cause a problem (e.g., for the artificial metric load to be completely reset upon database failover). For example, in a production system, after a database failover, the memory load of a newly promoted primary database would likely be smaller than the memory load of the previous primary database (e.g., because the new primary database wasn't previously servicing queries). Consequently, for some implementations of memory modeling in the benchmarking system, it may be sufficient to sample from a model object 154 using a default memory load value that describes a cold buffer pool. In some embodiments, for accuracy, models for resources like CPU and memory should be distinct for the primary and secondary database replicas in local-store premium (BC) databases.

However, for a disk usage metric, this load reset on database failover may lead to unexpected behavior in the benchmarking system. For instance, in a production cloud database system, disk usage behavior of local-store databases and that of remote-store databases differs during a failover. Each database replica of a local-store database stores a local copy of the data. This means that the disk usage of the secondaries will be very close to the disk usage of the primary (modulo data in transit). Standard (GP) databases may have only one replica, store all of the user data in remote storage (which is also redundantly replicated), and use the local disk only for temporary data (e.g., stored in tempDB). On a failover, a new replica will be built, but the data stored in tempDB will be lost. Because of this, the disk usage pattern of standard (GP) databases is similar to memory, where the load may be reset after a failover (stateless). However, this is not the case for local-store databases and their disk usage models should be made stateful to ensure the correct behavior.

The implementation of the benchmarking system may capture these stateless/stateful nuances by allowing persistence to be a configurable parameter in the model XML data. This allows disk usage for remote-store databases to be configured as non-persisted, whereas disk usage for local-storage databases may be configured as persisted. In instances where a resource usage metric is defined or configured as non-persisted, resource metric manager 152 may store the previously reported value in memory. To durably store a previously reported metric value, the metric value may be stored back to model database 120. For example, after executing a persisted metric's model logic, the new metric load may be written back to model database 120. On the next report interval, the previous metric load will be read from model database 120 and used for the computation of the next load value. For persisted disk usage, in order to allow only one replica to update the load (i.e., usage) in model database 120, only the primary database replica executes the model and persists the load. Secondary database replicas for premium (BC) databases (i.e., local storage databases) read the previously reported disk usage from model database 120, but they do not execute the usage model's logic. Secondaries simply report the disk usage read from model database 120. In this manner, on a failover, the newly promoted primary database of a premium (BC) database will have the same disk usage as the previous primary database replica, which is the same behavior that is exhibited in production systems.

3.3.3 Population Manager. The load orchestrator 108 component of the benchmarking system allows for declaratively overriding resource utilization via models, but in order to re-create a ring environment similar to a production ring environment, there should be churn in the number of databases in the ring. The database population in an example SQL database ring may repeatedly change, where databases are created and dropped regularly. The benchmarking system may imitate this churn by injecting new databases 114 into ring 110 and dropping some existing databases 114 via population manager 130. For example, population manager 130 may execute database population-change requests (e.g., database create and drop requests) according to, for example, weekday and/or weekend models trained on production creation/drop rates (see Section 4). Population manager 130's models may describe how many databases to create and/or drop per hour, the edition (i.e., service tier) of the databases, the service level objective (SLO) of the databases, and the initial metric load for each database. Population manager 130 may run as a stateless daemon that wakes up at a specified time (e.g., the top of each hour) to execute samples from the provided models, then schedule database create or drop requests for the next time period (e.g., hour). Each database create and drop request may then call a corresponding control plane API with the provided metadata from the model (e.g., create a 4-core local store database at 5:37 pm).

4. Building Models of Behavior

The following two modeling frameworks are provided for imitating production resource behaviors:

Population Change Events Model (i.e., Create DB and Drop DB model): Database create and drop patterns of an example SQL database system have been captured by modeling them as events that occur with a probability that belongs to a distribution. Based on empirical observations where create database events exhibit different patterns than drop events, the database create and database drop events have been modeled separately. The create DB model incorporates the SLO which implicitly captures "CPU reservation" for provisioned SQL databases, which is an input for placement decisions.

Disk usage model (i.e., a DB resource usage model): Since databases persistently store data (even idle databases), disk usage is an important resource to model in data rings. Other resource usage models such as memory and CPU are also useful (see below). Various types of disk usage patterns may be modeled separately.

In one implementation, the create DB and drop DB models (i.e., database population-change events model 136) are executed by population manager 130 and the disk usage model (e.g., DB resource usage models 138) are executed by resource metric managers 152. In this manner, it may be preferable to have a scalable model execution system, easy implementation in C++, that is computationally inexpensive and fast, that does not rely on external libraries, and still is able to capture the production patterns accurately. Various machine learning (ML) and statistical modeling approaches may be utilized. The ML model accuracy of random forest, linear regression, and autoregressive integrated moving average (ARIMA) have been found to be comparable with statistical approaches. The choice of a modeling approach may not be determined only by its accuracy, but also by other factors such as scalability (as described above). For example, ARIMA is computationally intensive since the model needs to search the optimal values of several parameters and that can make the model fitting process very time consuming. Due to the complexity of integrating external libraries into resource metric managers 152, and population manager 130, as well as other practical considerations, simple statistical models may be utilized as the building blocks for the modeling system's described herein.

4.1 DB Population-Change Models—Create DB and Drop DB 4.1.1 Overview. The create DB and drop DB models (i.e., database population-change events models 136) aim to imitate the number of net creates of databases within a fixed time interval. In some database systems, when creating a database, a user (e.g., customer) may be allowed to select a region or datacenter where the database is going to be hosted. However, the control plane (e.g., control nodes 102) may be responsible to select the specific ring (such as ring 110) for placing the database. In some embodiments, it may be advantageous to build the create DB and drop DB models using create and drop events at the region level. For simplification, it may be assumed that each tenant ring in a region has equal probability of being selected and the values of the model parameters may be scaled by the total number of tenant rings within that region.

4.1.2 Data Analysis. When modeling database creation and drop probabilities, if the analysis is performed on the granularity of seconds or a minute, there may be a low probability of a create or drop event occurring. Therefore, an aggregation time interval may be expanded to one hour for both the standard/GP (remote storage) and premium/BC (local storage) databases. The number of database creates and database drops have been modeled separately based on a set of features derived from hourly aggregated production data (e.g., dispersion box plots were created of the number of database creates per hour over a day for each of: standard/GP weekdays, standard/GP weekends, premium/BC weekdays, and premium/BC weekends). The database drop event patterns were similar to the database create event patterns. Below is a summary of the key features from the example:

(1) The number of create and drops exhibited hourly patterns for both standard/GP or premium/BC databases.
(2) In general, there were more creates and drops during the weekdays compared with the weekends for both standard/GP or premium/BC databases.
(3) Premium/BC databases had significantly fewer creates and drops than standard/GP databases across all hours.

TABLE 1

| Features used for create and drop models | |
|---|---|
| Features | Values |
| Temporal | Weekend vs. Weekday |
| Temporal | Hours |
| Database Edition | Standard/GP vs. Premium/BC |

4.1.3 Model Formulations. Based on the above findings and illustrated in Table 1, three features were used to formulate the model: weekday vs weekend, hour of the day, and service tier of the database. In total, 96(2×24×2) different create DB models and another 96 different drop DB models were built. For each hour, either on weekday or weekend and for each database edition, it was first assumed that the number of creates or drops within the training period belonged to a well-defined probability distribution. Then, the hourly training dataset was fitted via various probability distributions including normal, uniform, Poisson and negative binomial. The normal distribution was preferred over the other distributions mainly for two reasons: 1) its simulation results were most representative of the training dataset for database creates and drops, 2) it was found to be the best fitted distribution for the steady state growth of disk usage as well (see Section 4.2.2). The non-parametric Kolmogorov-Smirnov (K-S) test, a statistical test that helps determine whether a dataset follows a normal distribution, was then performed across all the hourly training datasets for both the standard/GP and premium/BC databases. It was concluded that the p-values (except a few of them for the premium/BC weekday drop) were greater than 0.05, hence, the null hypothesis that the training dataset followed a normal distribution was not rejected. Based on the K-S test outcomes, each hour was modeled as a separate normal distribution for the create DB models and drop DB models.

4.1.4 Simulation Results. To validate the trained models, they were executed in a simulated environment 100 times. According to the results, the "hourly normal" model was able to imitate the create and drop production trace closely. The modeled creates and drops were very close to the production curves. The mean of the 100 modeled curves nearly overlapped with the production curve.

4.2 Disk Usage Model 4.2.1 Overview. An example disk usage model (e.g., a model of DB resource usage models 138) aims to imitate disk usage growth patterns of databases within a ring over a fixed time interval. This was modeled by discretizing the disk usage for each database into 20 minute time periods and computing the "delta disk usage." The "delta disk usage" was the disk space usage difference between adjacent 20 minute time periods. After computing the "delta disk usage," it was observed that around 99.8% of the time, across databases and time stamps, the disk usage showed a steady-state growth pattern (see Section 4.2.2). For the remaining 0.2% of the time, it was dominated by initial creation growth (see Section 4.2.3) and predictable rapid growth patterns (see Section 4.2.4).

Databases in the example implementation of the benchmarking system and modeling system use the steady-state growth pattern (with different parameters for standard/GP and premium/GP databases) to determine what load should be reported to resource manager 106. A subset of databases use the "initial creation growth" pattern immediately upon creation. This pattern attempts to capture a common customer behavior of restoring a database from an existing media descriptor file (.mdf) (i.e., the primary data file). Similarly, only a subset of databases use the "predictable rapid growth" pattern. This growth pattern captures specific instances of temporal customer behavior (for example, a customer might do a batch import every day at midnight). The "initial creation and predictable rapid growth" patterns model large increases in disk usage that the steady state pattern cannot capture. For all of the growth patterns described above, standard/GP and premium/BC databases were modeled separately.

4.2.2 Steady State Growth. The "steady state growth" pattern was generated by training over the "delta disk usage" values. Several statistical approaches were explored including non-parametric kernel density estimations (KDE) and a customized binning model in which the training set was divided into bins, each with a probability. However, similar to the create DB and Drop DB models, the "delta disk usage" was imitated by using a "hourly normal" model for the following reasons:
  (1) Unlike customized binning, it could capture temporal disk usage patterns.
  (2) It had comparable or smaller dynamic time warping (DTW) and root mean squared errors (RMSE) than KDE and the customized binning model.
  (3) It was computationally efficient. Sampling from the model was just sampling from a normal distribution.
  (4) Unlike KDE, the hourly normal model was easy to implement and did not rely on an external C++ library.

The hourly normal model was trained using the 99.8% of the data that corresponded to the steady-state growth pattern. Modeling results of the steady state disk usage pattern were plotted. In the modeling results a plotted time series of disk usage production data exhibited temporal patterns and the "hourly normal" models were able to capture those patterns. The primary intention was to have the resulting cumulative disk usage from the models to be as close to production as possible over the two week training period while also achieving the modeled disk growth to be similar to the production curve, as was shown in the results.

4.2.3 Initial Creation Growth. A common customer workload pattern is to have rapid growth upon the creation of the database, either to restore from an existing .mdf file or to bulk load new data into the database. To attempt to capture these customer behaviors, in the example, a separate model was generated for rapid growth during the first 30 minutes of a database's existence. This model assumes that the high growth period will last for 30 minutes. Using the "delta disk usage" values computed previously, databases in the training set were labeled as "high initial growth" if they had growth of more than 12 GB within the first five minutes of the database's lifetime. Using this subset of the training data that is "high initial growth" a probability distribution was computed that described how much the database should grow in the first 30 minutes and a probability that a database should exhibit "high initial growth" behavior. Normal and uniform distributions were used to fit the dataset and uniform was chosen because it performed better during model fitting. The probability distribution was then created by partitioning the "high initial growth" delta disk usage values into five uniform bins, each with equal probability of being selected. When creating a database, the benchmarking system uses this probability and probability distribution to determine if the new database should have high initial growth. The simulation result from the model aligned well with the production data.

4.2.4 Predictable Rapid Growth Patterns. Upon empirical examination of the "delta disk usage" values, a subset of databases was discovered to have a clear temporal pattern to their disk usage. This pattern can be characterized as a large rapid spike in disk usage, followed by a rapid decrease in disk usage (this database may have been used as part of an extraction, transformation, and loading (ETL) pipeline, where new data is loaded in and old data is aged out). To capture this customer behavior, the training set was partitioned manually by selecting databases that exhibited this pattern by observing at their "delta disk usage" values over time. A probability was then computed for whether a database should exhibit "predictable rapid growth" using the counts in each partition. The "predictable rapid growth" pattern was implemented as a state machine inside of the benchmarking system, where each state is described by the growth magnitude and the amount of time until moving to the next state. Below are the states and the order in which they are executed:
  Steady State Growth
  Rapid Disk Increase
  Steady State Growth Between Spikes
  Rapid Disk Decrease Similar to the "initial creation growth," the growth magnitude parameter for the rapid growth states was computed by binning the "delta disk usage" values into five buckets of equal probability and using a uniform distribution within each bucket. The time parameter for each state was computed by taking the average time in each state for every database in the rapid growth training set.

5. The Relationship Between the DB Simulation Modeling System and the Load Orchestrator The DB simulation modeling system may be thought of as powering the load orchestrator.

5.1 Load Orchestrator

As described above, a load orchestrator, such as load orchestrator 108A and 108B, are part of a benchmarking system for evaluating efficiency of a database cloud service that leverages orchestration framework 104. In general, a load orchestrator may comprise a declarative system that describes each database's resource utilization behavior and a ring's population demographics based on a modeling system. The models of the modeling framework may be constructed from production system telemetry traces. A goal of a load orchestrator may be to consistently generate the same SQL database scenario in a production-like ring and "play it forward" to evaluate efficiency improvements and their tradeoffs.

When compared to other validation tools used to evaluate efficiency, load orchestrators 108 comprise a system that may be considered a middle of the spectrum solution. While component simulators may be fast, inexpensive, and very targeted, they may also have decreased realism because they disregard other components in the SQL database stack. This may be contrasted with running actual SQL queries on databases in a ring, which may be more realistic because it executes the full SQL database stack, but as mentioned before, it is not representative of a cloud production workload. Moreover, this method is expensive to run at scale. Load orchestrator 108 provides a nice balance between these other two approaches as it can drive resource consumption of a ring without actually issuing T-SQL queries, which allows load orchestrator to scale to many databases easily, and it also executes the full SQL database stack.

5.2 Powering Load Orchestrator with the DB Simulation Modeling Framework

As described above, FIG. 1 shows a high-level architecture including load orchestrators 108A and 108B (i.e., load orchestrators 108) and resource metric managers 152A and 152B (i.e., resource metric managers 152). Resource metric managers 152 may be configured to read DB resource usage model 138 XML from model database 120 in orchestration framework 104. The DB resource usage model 138 XML may comprise a declarative representation of the database's resource behavior. In one example, resource metric manager 152A may parse the read DB resource usage model 138 XML and construct internal model objects 154A, which may comprise logic on how a database's resource load should change. When an SQL database replica (e.g., database 114A) asks for its resource usage metric, load orchestrator 108A intercepts the request inside resource metric manager 152A, and consults model objects 154A for the resource usage metric value that database 114A should report to resource manager 106 as an artificial resource usage metric (i.e., a model defined resource usage metric). Load orchestrator 108A is configured to provide the model defined resource usage metric value to database 114A, and database 114A is configured to report the artificial resource usage metric to resource manager 106, which may conduct PLB operations based on the artificial resource usage metric. Load orchestrator 108A may operate in a similar or same manner with respect to databases 114B and 114C. Moreover, load orchestrator 108B may operate in a similar or same manner as load orchestrator 108A, with respect to databases 114D and 114E.

Still further, in order to create a realistic ring (i.e., cluster) scenario, it may not be good enough to merely define the resource usage behavior for existing databases (i.e., an initial population of databases). For example, in some embodiments, SQL database population demographics of a ring may repeatedly or constantly change over time. Therefore, to model a more realistic system, the ring model may include database churn information. To do this, another service referred to as population manager 130 may be created. For example, population manager 130 may also utilize models derived from production telemetry and may issue database create and database drop commands to control ring 110. Population Manager 130 may be implemented as a series of timer tasks, waking up periodically (e.g., once an hour) to sample from DB population-change events model 136 (i.e., DB create and DB drop events), schedule the indicated database create and/or drops, and then go back to sleep.

6. The DB Simulation Modeling Framework

6.1 Technology Overview

As described above, a large cloud service repeatedly (or continuously) updates the service to better meet the needs of its customers. Before rolling out configuration, policies, or feature changes in a production ring, a stage ring may be utilized to evaluate and monitor their functionalities and effects in order to reduce negative impacts on live customer systems. To conduct evaluations that are fair and robust, a production like environment may be repeatedly generated on a stage cluster. Database activities may occur at node level and at ring level, including but not limited to, database creation, database restore, database drop, and database failover. In addition, production workloads change over time as do reported resource usage metrics. To better mimic a production environment in stage cluster at scale and with acceptable cost, a benchmark system that can generate production representative scenarios at database, node and cluster level is provided. Load orchestrators 108 underpinned by the DB simulation modeling framework provide the core of the benchmarking system.

6.2 Challenges

As described above, an SQL database cloud service may serve multiple regions where each region may hold hundreds to thousands of rings (i.e., clusters). Different rings may be configured with different sizes, which may be determined based on the number of nodes per ring and node configurations. The number of databases hosted per ring may vary and the distribution of service tiers (e.g., remote vs local storage databases) and SLOs (e.g., one or more of resource capacities, resource configuration options, resource availability, resource performance, resource scalability, etc.) among the databases may vary as well. Resource usage metrics (e.g., disk usage, memory usage, compute usage, etc.) may be emitted periodically (e.g., every few minutes), and customer workload patterns are not fixed. In a production system, databases themselves may also change dynamically as customers may have the freedom to create new databases, restore from existing databases, and drop databases at any time. These described conditions pose multiple challenges in simulating an SQL database population at a tenant ring level, some of which are described as follows.

It is difficult to select a training data set for ring modeling.
        As described above, database populations and activities can vary across different rings and rings change dynamically over time. If a model is trained based on all rings in a population of rings, the resulting model may not be flexible enough to cover a majority of scenarios that occur in a ring. If training is based on one model per ring, the model will tend to overfit, and the number of models needed will be too large to maintain.
    For rings with similar resource usage profiles, their underlying database population distributions might be very different. A generalized and flexible model that can generate different database distributions with a certain probability is desirable. Another difficulty is how to select a population of databases that can be representative of the majority of rings in a production system.

Database resource usage patterns can be complex for various reasons, for example:
  a. Several resource dimensions should be considered, including but not limited to memory, disk, and CPU.
  b. Resource usage patterns are not always stable. In one example, production telemetry suggested that some "outlier" behavior does exist. For example, some premium databases have large disk usage increases and decreases periodically. Also, there exists rapid resource growth for some databases when they are first created.

Different types of customers exhibit different workload patterns. For example, some customer databases are mostly idle and don't run any queries for a long time. Also, temporal features should be considered, as most databases appear to have more activities during business hours and/or weekdays than non-business hours and/or weekends.

In addition to complex resource usage patterns, the database population on a ring may also change dynamically. New databases can be created on a cluster or existing databases can be dropped from the cluster.

Model complexity should be suitably reduced for building the models into the SQL database stack. Model efficiency, future maintenance, and re-training cost should be taken into consideration.

6.3 DB Simulation Modeling Framework Components

Figure 2:
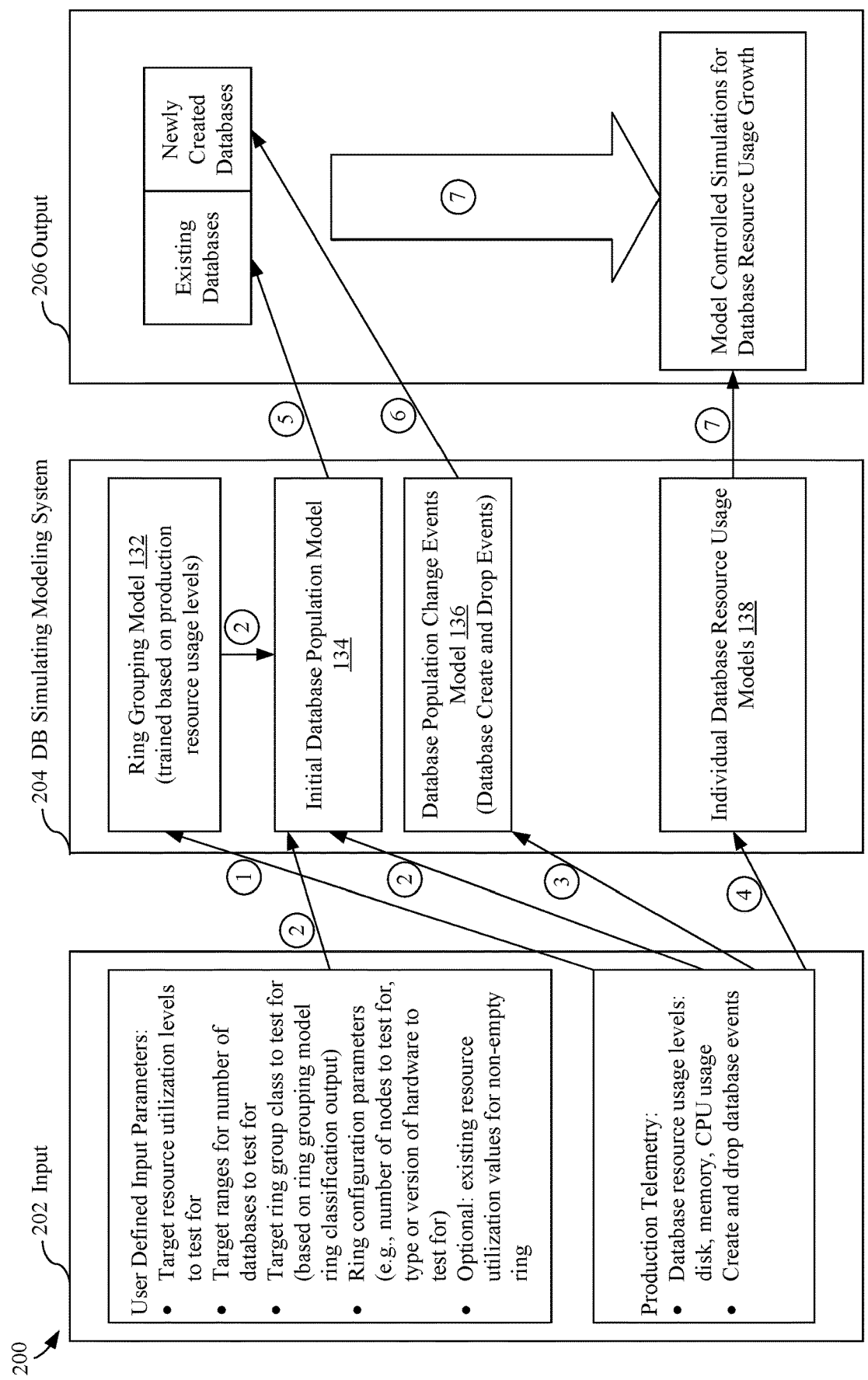
FIG. 2 is a diagram of example steps and dataflows in a database simulation modeling system, according to an example embodiment.

One or more DB simulation models may be utilized to support load orchestrator operations in a benchmarking system. The modeling system may be configured to produce a variety of database events and activities at a ring level. Also, it can be scaled and generalized to simulate database activities at a node level and/or a region level. FIG. 2 is a diagram representing an overview of example steps and dataflows in a DB simulation modeling system 200, according to an example embodiment.

As shown in FIG. 2, a system 200 includes input 202 for a DB simulator modeling system 204 (also referred to as modeling system 204 or modeling framework), and output 206 from modeling system 204. Input 202 includes input that may comprise user defined parameters and a training dataset. The training dataset comprises, or is derived from, telemetry data such as resource usage measurements (i.e., metrics) generated by a production database system. Modeling system 204 includes multiple models for DB simulation modeling. For example, modeling system 204 includes ring grouping model 132, initial database population model 134, database population-change events model 136, and individual database resource usage models 138. Also shown in FIG. 2 are numbered arrows (1-7) that show ordered steps and data flow of the DB simulation modeling framework. For instance, the numbered arrows represent the following steps.

1. Production telemetry data of input 202 (e.g., database resource usage levels) may be used to train ring grouping model 132, and a fixed number of ring groups are generated based on the database resource utilization levels. Each ring group may be characterized based on DB resource usage levels of the ring (e.g., a ring group may be classified as having high disk usage and a medium number of compute cores, or high disk usage and low memory usage, etc.).

2. An initial database population for a ring may be generated utilizing user-defined input parameters of input 202 (e.g., target disk and memory resource utilization levels, target range for the number of databases in a ring, target ring group classification, etc.), production telemetry of input 202, and parameters trained from the ring grouping model. The existing databases of output 206 comprises an initial population of databases.

3. The production telemetry data of input 202 (e.g., the create and drop database events production telemetry) may be used to train the database population-change events model 136 of modeling system 204.

4. The production telemetry of input 202 may be used to train the individual database resource usage models 138 (e.g., for disk and memory usage) for individual databases.

5. The existing databases of output 206 are generated based on the initial database population model 134 of modeling system 240, where each initial database may be defined based on: (1) service tier (e.g., remote or local database storage), (2) SLO configuration options that may be defined based on user input (e.g., configuration parameters), including type, capacity (e.g., size or count of elements), or performance levels of software and/or hardware resources available to the databases (e.g., compute cores (virtual or physical machines or devices), memory (e.g., DRAM), disk space, etc.), and (3) resource usage metrics of a production (e.g., deployed and/or in-service) database system.

6. Database population-change events model 136 of modeling system 204 is used to determine the number of databases to be created (e.g., the newly created databases of output 206) and the number to be dropped for each period (e.g., over an hour). Once the number of databases to be created is determined, the database population-change events model 136 will determine the edition (i.e., service tier), SLO, and resource usage metrics of the newly created databases.

7. Individual database resource usage models 138 are used to simulate database resource usage periodically (e.g., for every x minutes) for both existing databases and newly created databases. See section 6.3.3. for additional information.

6.3.1 Ring Grouping Model. Ring grouping model 132 is used to determine a fixed number of ring groups that are used to represent production rings that may be deployed in different regions, based on their resource utilization levels. Rings may be classified into different groups according to types of resource utilization levels. For example, the resource utilization may include one or more of compute resource utilization, disk space utilization, and memory utilization, where each resource may be characterized as having a high, medium, or low level utilization (e.g., some ring groups may be characterized as having high disk utilization and low memory utilization, low disk utilization and high compute cores, etc.). This model may be used to determine initial bootstrap model parameters. Different ring classes have different parameters and distributions. To start a load orchestrator experiment or test, a ring may be initialized with databases and a targeted ring class may be determined based on resource utilization levels.

In one example, three types of resource utilization metrics are utilized including CPU (or compute), disk, and memory utilization. For each resource there may be three possible utilization levels including high, medium, and low that may be used in classifying a ring group based on threshold levels. However, the disclosure is not limited to these resource types and metric usage levels, and any suitable types of resources and metrics (or utilization) levels may be utilized.

In one example of ring grouping model 132, there are 27 ring groups. The ring grouping model may be fast and flexible, and cover both a time range and multiple resource usage dimensions (e.g., CPU, disk, and memory dimensions). A one-week, 3-dimensional, ring level resource utilization time series is gathered. For each resource dimension, summary statistics of the time series are calculated (e.g., median, 25%, and 75%-quantiles). These summary statistics are compared to pre-defined thresholds, and each ring is classified into a high, medium, or low resource usage level in each resource dimension based on the thresholds. For example, if a ring has high disk and medium number of compute cores, then it is classified it into a high disk, medium number of cores ring group. There are two example ways to select the thresholds: they can be generated from the summary statistics of production telemetries, or they can be determined by a pre-determined number of databases in each ring group. Once these thresholds are determined, any production rings in the training set may be classified into each group.

6.3.2 Initial Database Population Model. This model may be utilized to generate a population of databases that mimics a snapshot of production ring classes, and reaches targeted resource utilization levels (e.g., 80% of memory utilization). The generated population of databases may be used to initialize a staged ring (or staged portion of a partitioned production ring) for a load orchestrator 108 experiment or test. As described above, the output of this initial database population model is a population of databases that are defined by service tiers, SLOs, and resource usage metrics. User input parameters for this model may include targeted ring class(es), number of node(s), a target range for the allowable number of databases, target resource utilization levels or ranges, and ring configuration parameters, such as CPU, disk space, and/or memory capacities. The distribution of database service tiers, SLO, and resource usage may be determined by the targeted ring group. A reusable tool may be used to generate the initial population directly. This tool can target both an empty ring or non-empty ring.

A search is conducted for a range of database counts to reach the targeted utilization levels. For each search, a 3-step procedure is used to generate a population of databases and calculate their ring level resource utilizations. The three procedure steps are as follows:
1. A list of SLOs is determined. In this example, based on observation, it is determined that higher cost SLOs sometimes are not included in a ring. For example, higher cost SLOs may include higher value compute cores, memory, disk space, etc., such as newer generations of hardware and/or software, or local storage (business critical) databases. Therefore, the probability of existence of each SLO in the ring is calculated, which comprises the percentage of rings in the training set that has a particular SLO and uses a particular array of probabilities, to determine a list of SLOs existing in the initial population.
2. After a list of SLOs is fixed, the probability of each SLO, which is the median of percentage of SLOs for all rings in that ring group, is used to decide the number of databases in each SLO, given the total number of databases fixed.
3. For each individual database, a collection of uniform distributions is used for each SLO to model its initial resource metric values. More bins are generated at the upper bound of a training set to manage the heavy-tail problem.

The ring level resource utilizations are calculated based on ring capacities in all three dimensions, and iterated over steps 1-3 until the targeted resource utilization levels are reached.

Figure 3:
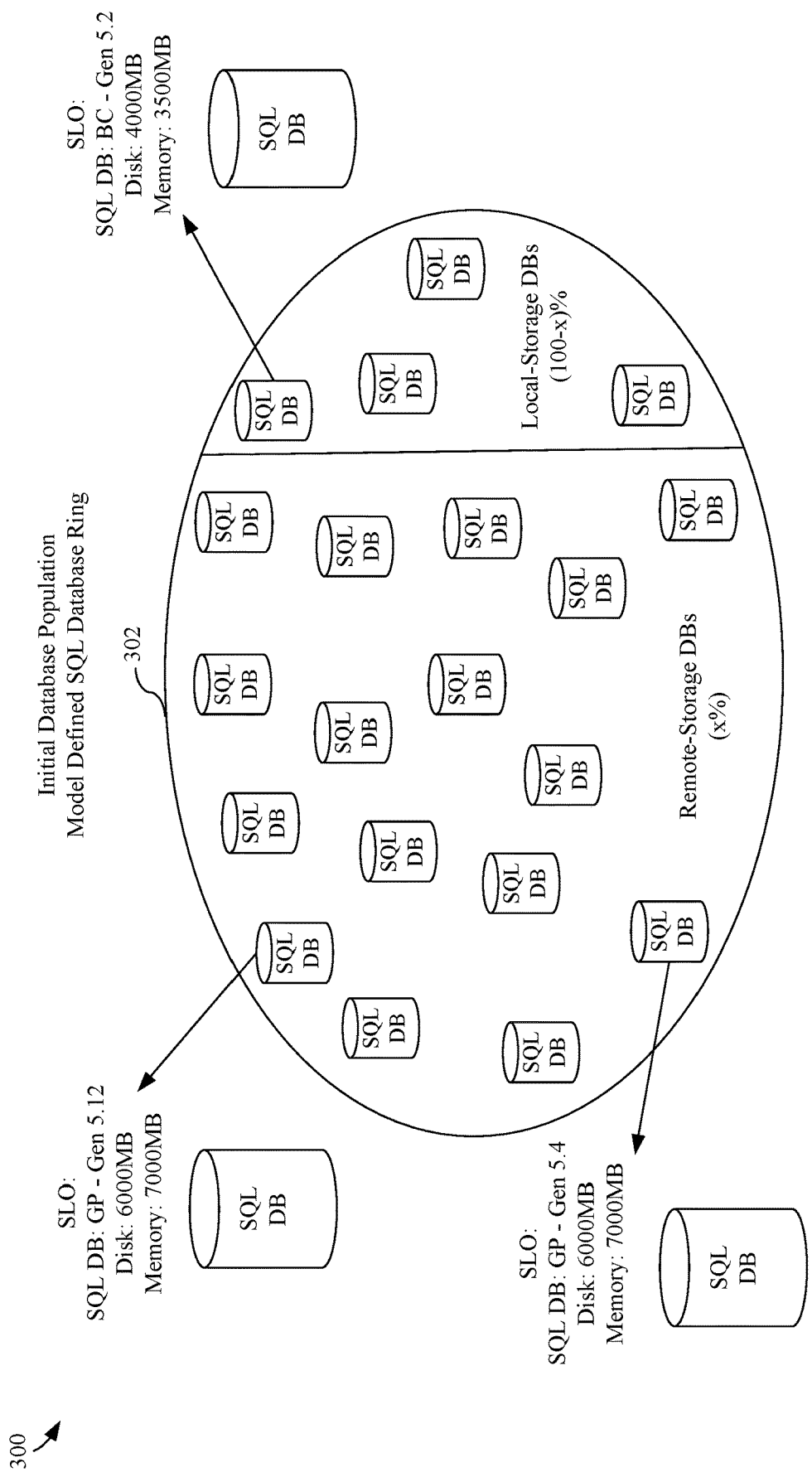
FIG. 3 is a diagram of a system comprising a ring with an initial population of databases, where the ring and initial population of databases are defined based on a ring grouping model and initial database population model, in accordance with an example embodiment.

A reusable tool may be created to generate an initial databases population with user-defined parameters. For example, a reusable tool may be created using a script (e.g., Python scripts) to generate an initial bootstrap population with targeted compute and disk utilization levels. The script may generate an initial bootstrap population of databases, with model defined percentages of standard (remote storage) and premium (local storage) databases, to start a load orchestrator test. The initial population model and the tool may be flexible and scalable enough to target any suitable ring groups and any suitable resource utilization levels. In addition, the model and tool may be configured to set up a databases population for both an empty ring (with no databases) or a ring with "existing" databases. Once all the parameters are provided, the initial database population model can determine the percentage of local-storage and remote-storage databases, and for each database, it can assign a model-controlled SLO comprising disk space and memory values. For instance, FIG. 3 is a diagram of a system 300 comprising a ring with an initial population of databases, where the ring and initial population of databases are defined based on a ring grouping model and initial database population model, in accordance with an example embodiment. System 300 comprises a representation of a model-defined SQL database ring 302 comprising a plurality of SQL databases, where the ring has a model-defined percentage of remote storage databases and percentage of local storage databases. Each database in ring 302 has a set of model defined attributes which may include the SLO. The SLO may be indicated by, for example, a version or generation of hardware and/or software (e.g., of a compute core or CPU), available disk space, and available memory for the database.

6.3.3 Individual Database Resource Usage Models. Separate models may be used for different resource usage metrics including, for example, disk space and memory.

6.3.3.1 Disk Space Model: An example individual model is provided for disk space. In the disk space model example, a $\Delta$ disk (i.e., delta disk usage) at time t may be modeled, where $\Delta$ disk at time t is defined as the disk space usage change between consecutive timestamps: $\Delta disk_t = disk_t - disk_{t-1}$. Also, there are three sub-models as follows:
1. Steady-state growth model: This example model is used to model the steady-state growth of both standard (GP—remote storage) and premium (BC—local storage) databases. For premium databases, the lower and upper 0.01% of $\Delta$ disk values are removed and the following described predictable rapid growth model is considered. For each hour and for each edition, the mean and standard deviation of $\Delta$ disk is calculated and a normal distribution is generated to simulate the disk space increase or decrease between consecutive observation timestamps.
2. Predictable rapid growth model: This example model is used to model the lower and upper 0.01% of $\Delta$ disk for premium databases. A few premium databases having a temporal pattern in their disk space usage have been observed, and this pattern cannot be modeled in the steady-state growth model, as the usage magnitude is too large to fit into the same probability distribution. As described above, this pattern can be characterized as a large rapid spike in disk usage followed by a rapid decrease. A first calculated probability indicates that a premium database has this pattern. This subset of databases is characterized as a state machine, where each state is described by the disk growth magnitude and the amount of time until moving to the next state. The state machine has four states:

Steady State Growth
Rapid Disk Increase
Steady State Growth Between Spikes
Rapid Disk Decrease The time lapses between each pair of consecutive states is calculated. For the rapid disk increase and decrease states, 5-bin uniform distributions are used to simulate their magnitude.

3. Initial creation growth model: This model is used to model the initial disk growth for newly created or restored databases. As described above, databases in a training set are labeled as "high initial growth" if they have growth of more than 12 GB within the first five minutes after creation. Then a 5-bin uniform distribution is computed, which describes the databases' growth in the first 30 minutes after creation and a probability that a database should exhibit this behavior.

6.3.3.1 Memory Model: One example individual model for memory usage may be used to simulate memory usage directly (e.g., rather than a Δ memory) at the database level. The memory model may be trained using production system memory usage telemetry data. Two example sub-models for memory usage may comprise the following:

1. Steady-state growth model: used to model the steady-state growth behavior at a database level for both standard and premium databases. The memory model may be trained using production system memory usage telemetry data for each SLO.
2. Initial creation growth model: used to model memory usage growth at the time of initial creation or failover of databases. This model may generate a XML file to be used when bootstrapping the initial population of databases for load orchestrator experiments or tests.

Figure 4:
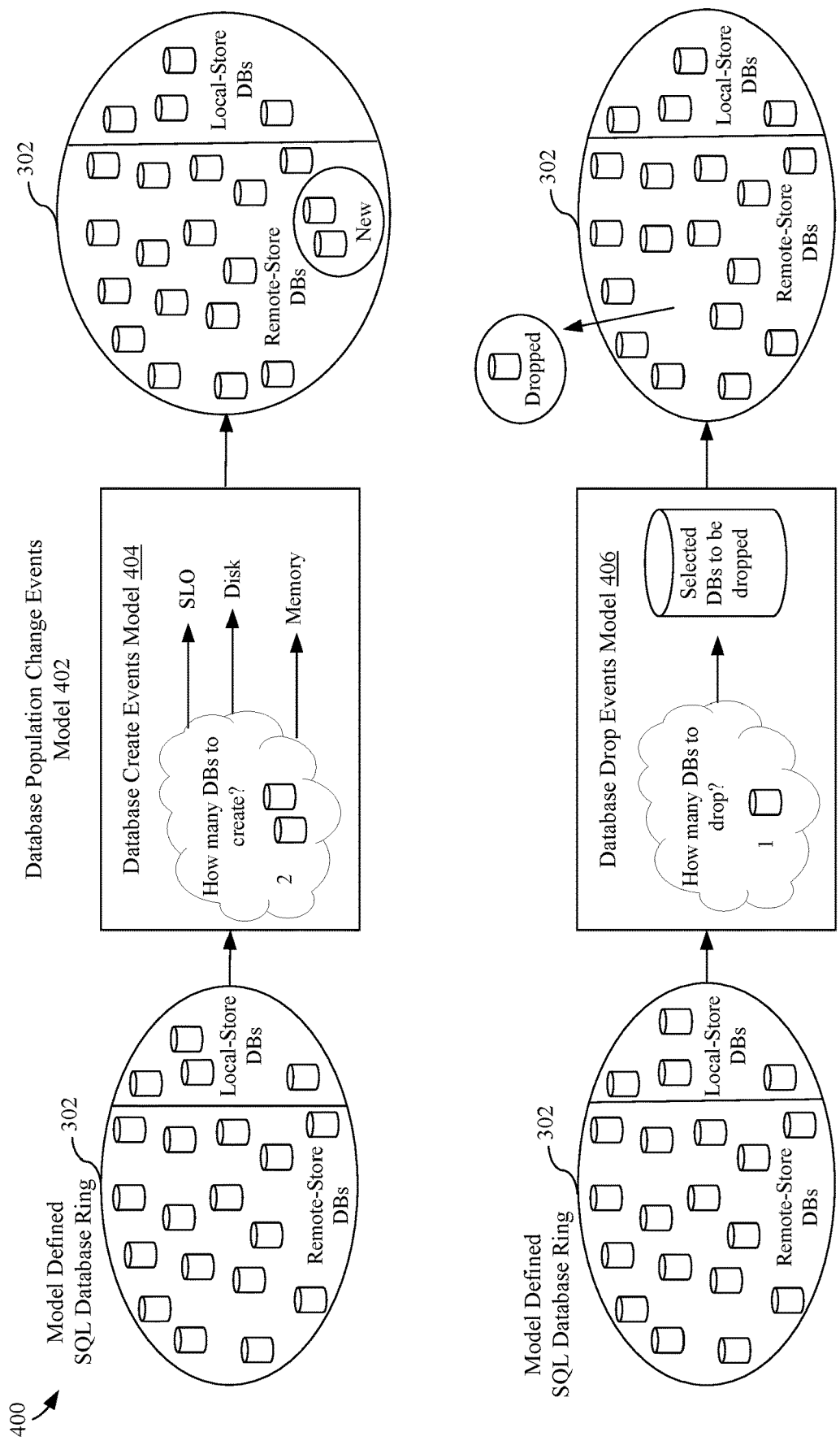
FIG. 4 shows a system comprising a database create events model and a database drop events model for creating and dropping databases over time in a ring, according to an example embodiment.

6.3.4 Database Population-Change Events Model (Database Create and Drop Events Model). FIG. 4 shows a system 400 comprising a database create events model and a database drop events model that operate together as a database population-change events model for creating and dropping databases over time in a ring. Referring to FIG. 4, system 400 includes the model defined SQL database ring 302, a database population-change events model 402 that comprises a database create events model 404 and a database drop events model 406.

Database population-change events model 402 is configured to produce ring-level create and drop events model simulation outputs. As shown in the top row of FIG. 4, database create events model 404 functions to create new databases in model defined SQL database ring 302, and in the bottom row, database drop events model 406 functions to remove or drop databases from model defined SQL database ring 302.

Database population-change events model 402 is used to simulate database creation and drop events over time that occur after the initial database population of databases is established in a ring. Different features that correlate with database create and drop events include:

1. Temporal: weekdays and weekends.
2. Temporal: business hours and non-business hours.
3. Database type or edition (e.g., remote storage and local storage databases).

In one example, 2*24*2=96 different models are utilized for simulating the number of database create events, and another set of 96 models are utilized for simulating the number of database drops events. Periodically, (e.g., in each hour), the mean and standard deviation may be generated from the training set, and a truncated normal distribution (e.g., truncated at 0) may be simulated to model the number of database create and drop events.

At each time period (e.g., each hour), the database population-change events model determines the number of databases to be created and/or the number to be dropped, and also selects the types (e.g., attributes) of the databases to be added or removed from the ring.

7. Example Applications

From high level, referring to FIGS. 1-2, the first step in setting up a testing scenario or experiment may be to initialize ring 110 with a population of databases 114 (e.g., based on the ring grouping model 132 and initial database population model 134). As described above, a reusable tool may be utilized to automatically set up the ring, where each database in the ring is assigned to a SLO and resource usage values defined by the initial database population model. Before starting a test, a usage model XML file may be overwritten with the individual database resource usage models 138 parameter values. Then, database population-change events model 136 may be initiated to start the test. Once it begins, for every x minutes each database 114 (existing or newly created database) may report its model-generated resource usage values to resource manager 106.

Since all the models described above are composable, depending on the target application (e.g., database application or another type such as a website) the models can be used individually or collectively. For example:

1. Using all the models of the database simulation modeling framework together: The modeling framework described herein may be used together with a load orchestrator system (e.g., comprising load orchestrator 108A and/or 108B) to simulate SQL database ring activities and resource utilization, with a realistic dynamic database population model and realistic SQL workload imitation. It can be used as a stage cluster testing tool to evaluate the impact of new features. For example, as described below, a load orchestrator system may be used together with the database simulation modeling framework to evaluate various overbooking ratios.
2. Ring Grouping Model: Ad-hoc analysis may be performed on ring resource usage levels and new features may be applied to a particular ring group type (e.g. high disk usage and medium memory usage rings). For example, at a higher level, an inter-tenant ring load balancer (that chooses a cluster ring for DB placement), effectively does population shaping per ring. Ring grouping models provide information on the types of DB population demographics currently existing in the rings, and also the effectiveness of these inter-tenant ring balancers should they employ certain policies.
3. Initial Population Model and Individual Database Resource Usage Models: an application scenario may comprise testing SQL database system resiliency to a large scale outage. If a cluster has already been partially filled with some specific database population according one set of target parameters. The cluster capacity, having that partial fill, may not have represented a steady-state production density. A "general" population model based on recent data may then be utilized to fill in the cluster to reach an acceptable density.

7.1 A Database Overbooking Application

To better illustrate how the modeling framework supports a load orchestrator system for various applications, a first application type is reviewed for using all database simulation modeling framework models together to simulate SQL database system ring activities and resource utilizations.

As described above, an SQL database system may repeatedly (or perpetually) be engaged in an effort to increase the efficiency of running the database service by increasing (e.g., maximizing) the number of customer databases that can be hosted on a fixed-size cluster of servers. This type of effort may be referred to as an overbooking effort. To accurately and reliably evaluate the effect of different parameters, thresholds, and features on the degree of cluster oversubscription and simultaneously measure the effect on the quality of service, users (e.g., an SQL DB administrator or engineer team) may leverage a load orchestrator system supported by the models of the modeling framework to run a series of experiments on a stage cluster. The experiment results and analysis outcomes may help the team of users to make decisions, based on data, about a plan to implement various overbooking ratios.

Figure 5:
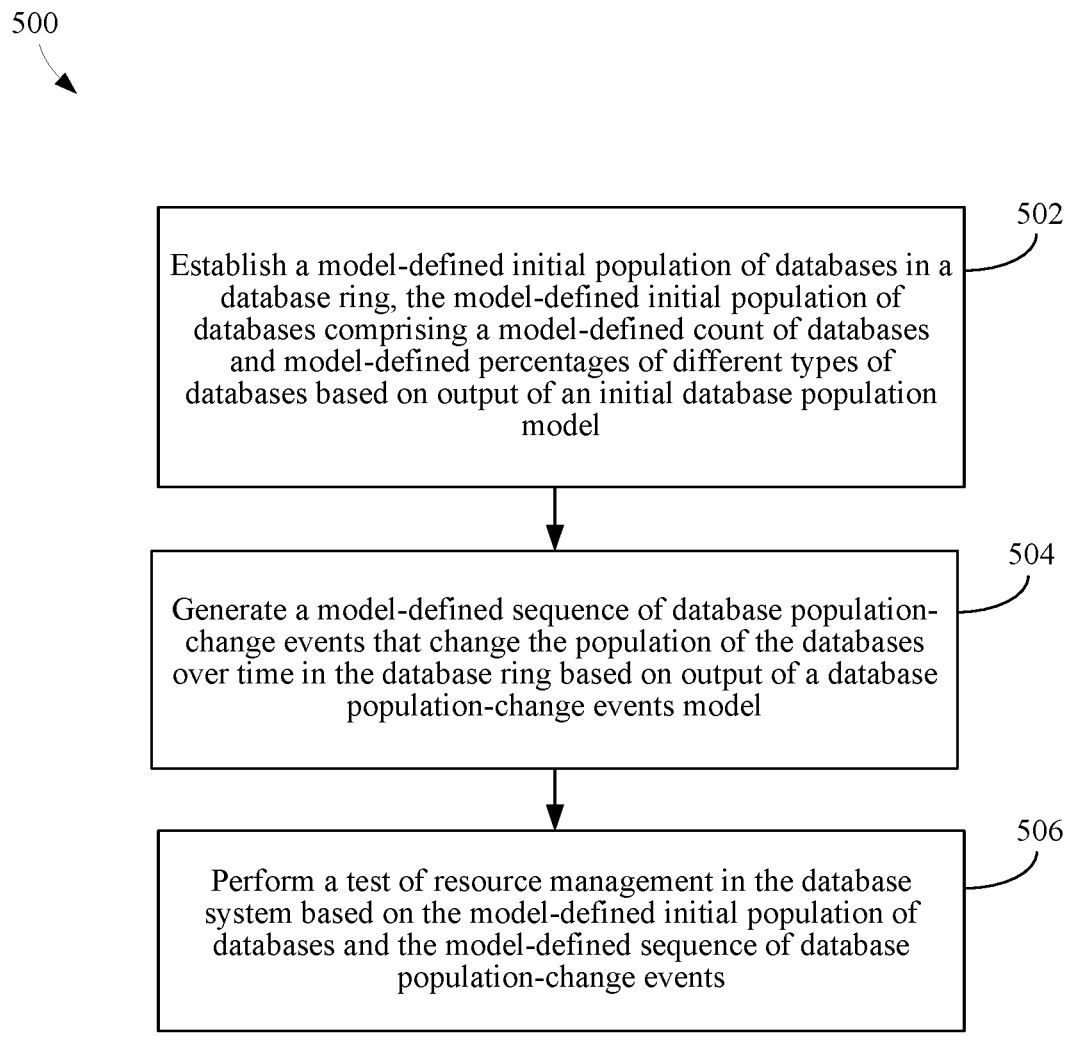
FIG. 5 is a flowchart of a method for creating a resource management testing environment based on an initial database population model and a database population-change events model, according to an example embodiment.

Orchestration framework 104 may be tested in various ways based on various models of a modeling framework. For instance, FIG. 5 is a flowchart 500 of a method for creating a resource management testing environment based on an initial database population model and a database population-change events model, according to an example embodiment. Flowchart 500 may be implemented in systems 100, 200, 300, and 400. For purposes of illustration, flowchart 500 is described with reference to FIG. 1, FIG. 2, FIG. 3, and FIG. 4. Other structural and operational embodiments will be apparent to persons skilled in the relevant art(s) based on the following discussion regarding flowchart 500.

Flowchart 500 of FIG. 5 begins with step 502. In step 502, a model-defined initial population of databases is established in a database ring. The model-defined initial population of databases comprises a model-defined count of databases and model-defined proportions of different types of databases based on output of an initial database population model. As described above, initial database population model 134 may be trained based on resource usage metric data reported in production database systems. For example, initial DB population generator 140 may be configured to place databases such as databases 114A-114C in node 112A, and databases 114D-114E in node 112B based on output from initial database population model 134, where initial database population model 134 may utilize output parameters from ring grouping model 132 to determine features of ring 110. For example, ring 110 may be characterized as having a classification based on resource usage metrics (e.g., classified as having a low number of compute cores and a high level of disk usage, etc.) based on output of ring grouping model 132. Similarly, with reference to FIG. 3, initial DB population generator 134 may be configured to configure and/or place the initial population of databases shown in model-defined SQL database ring 302, where features (e.g., SLO) of the initial population of databases (e.g., local versus remote storage, hardware and/or software types or generations, and initial resource usage metric levels for disk and or memory usage) are determined based on output of the initial database population model 134. Moreover, ring 302 may comprise an initial database population model-defined percentage of remote storage databases and percentage of local storage databases. The SLO of three of the databases in FIG. 3 are indicated by generation of hardware and/or software of a compute core (e.g., Gen 5.12), disk space, memory space, and remote versus local storage databases.

In step 504, a model-defined sequence of database population-change events that change the population of the databases over time is generated in the database ring based on output of a database population-change events model. Database population-change events model 136 may be trained with data from database drop event and database add event reports in a production database system. For example, based on output of database population change events model 136, population manager 130 may indicate to DB population change generator 142 to add and/or drop databases in nodes 112A and 112B of cluster 110, or in other clusters, and may indicate features of those databases (e.g., SLO). Database population-change events model 136 may define these changes to imitate the type of database churn that occurs in cloud based production database systems in order to create a more realistic testing environment for testing resource management operations of orchestration framework 104. Moreover, referring to FIG. 4, DB population change generator 142 may be configured to add and/or remove one or more databases from model defined database ring 302 based on output of database create events model 404 and database drop events model 406 respectively. Database create events model 404 may be configured to determine hardware and/or software resources and/or features of the added databases, such as types and numbers of compute cores, available disk space, and available memory space.

In step 506, a test of resource management is performed in the database system based on the model-defined initial population of databases and the model-defined sequence of database population-change events. For example, operations of resource manager 106 may be tested or exercised based on artificial metrics defined by models of DB resource usage models 138 that are communicated to model database 120. As described above, administrator API 122 in control nodes 102 may be called by a user via user interface 126, or during ring 110 boot, to write a serialized representation of database resource usage models 138 in XML to model database 120. Resource metric manager 152A may read the model XML data, parse the model XML, and construct model objects 154A for generation of artificial resource usage metrics. When database 114A is ready to report its artificial metrics to resource manager 106 for testing purposes, database 114A issues an RPC to resource metric manager 152A, which consults model objects 154A and determines the artificial resource usage metric values, and returns the artificial metric values to database 114A. In response to receiving the artificial metric values, database 114A transmits the artificial metric values to resource manager 106, which in turn, generates control output 150 and performs PLB operations based on the artificial metric values. As the population of databases in ring 110 changes over time in response to output of database change events model 136 output, the process of generating and sending artificial DB resource usage metric from DB resource usage metrics model 138 may be repeated for each modified population of databases. In this manner, various what-if scenarios may be tested based on different staged testing configurations.

Figure 6:
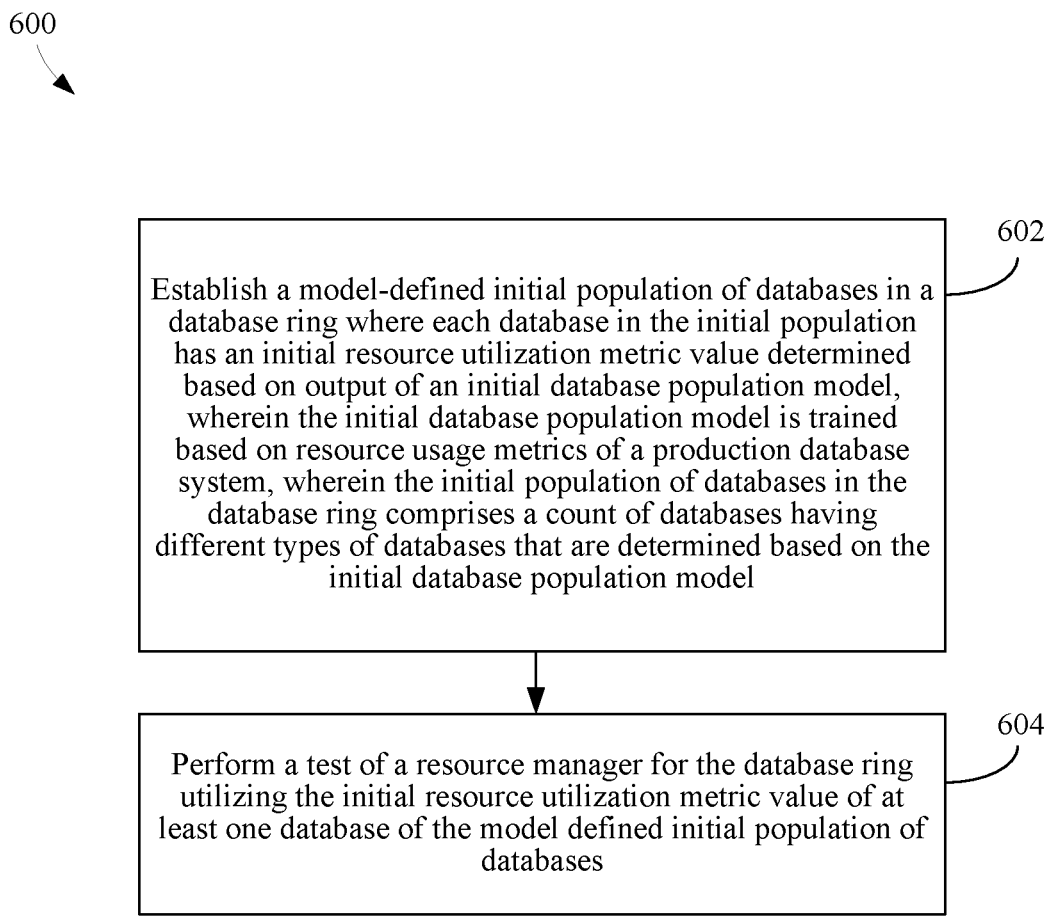
FIG. 6 is a flowchart of a method for creating a resource management testing environment based on an initial database population model, according to an example embodiment.

As noted above, orchestration framework 104 may be tested in various ways based on various models of a modeling framework. For instance, FIG. 6 is a flowchart 600 of a method for creating a resource management testing environment based on an initial database population model, according to an example embodiment. Flowchart 600 may be implemented in systems 100, 200, 300, and 400. For purposes of illustration, flowchart 600 is described with reference to FIG. 1, FIG. 2, FIG. 3, and FIG. 4. Other structural and operational embodiments will be apparent to persons skilled in the relevant art(s) based on the following discussion regarding flowchart 600.

Flowchart 600 of FIG. 6 begins with step 602. In step 602 a model-defined initial population of databases is established in a database ring where each database in the initial population has an initial resource utilization metric value determined based on output of an initial database population model, wherein the initial database population model is trained based on resource usage metrics of a production database system. As described above, with respect to FIGS. 1-3, initial database population model 134 may be trained based on resource usage metric data that is reported by production database systems. Initial DB population generator 140 may be configured to establish (e.g., place) databases such as databases 114A-114C in node 112A based on output from initial database population model 134, where initial databased population model 134 may utilize output parameters from ring grouping model 132 and user input with target features to determine some features of ring 110. For example, ring 110 may be classified as having a low number of compute cores and a high level of disk usage, based on output of ring grouping model 132. To determine the initial resource utilization metric values for each database, in one example, the probability of existence of each SLO may be calculated, which determines the percentage of databases in the training set that have a particular SLO. This array of probabilities may be used to determine a list of SLOs existing in the initial population of databases. After a list of SLOs is fixed, the probability of each SLO may be used to decide the number of databases in each SLO, given the total number of fixed databases. For each individual database, a collection of uniform distributions for each SLO may be used to model its initial resource metric values. With reference to FIG. 1 and FIG. 3, initial DB population generator 140 may also be configured to configure and/or place the initial population of databases shown in model-defined SQL database ring 302, where features (e.g., SLO) of the initial population of databases (e.g., local versus remote storage, hardware and/or software types or generations, and initial resource usage metric levels for disk and or memory usage) are determined based on output of the initial database population model 134.

In the initial population of databases in the database ring comprises a count of databases having different types of databases that are determined based on the initial database population model. As described above, with reference to FIG. 1 and FIG. 3, initial DB population generator 140 may be configured to configure and/or place the initial population of databases shown in model-defined SQL database ring 302, where features (e.g., SLO) of the initial population of databases (e.g., local versus remote storage, hardware and/or software types or generations, and initial resource usage metric levels for disk and or memory usage) are determined based on output of the initial database population model 134. Moreover, ring 302 may comprise an initial database population model-defined percentage of remote storage databases and percentage of local storage databases. The SLO of three of the databases in FIG. 3 are indicated by generation of hardware and/or software of a compute core (e.g., Gen 5.12), disk space values, memory space values, and remote versus local storage databases.

In step 604, a test of a resource manager is performed for the database ring utilizing the initial resource utilization metric value of at least one database of the model defined initial population of databases. For example, operations of resource manager 106 (e.g., PLB operations) may be tested or exercised based on artificial metrics defined by initial database population model 134 and reported by databases of the initial population of databases to resource manager 106 for testing purposes. For example, database 114A may be a member of the initial population of databases and may transmit its initial artificial metric values to resource manager 106, which in turn, generates control output 150 and performs PLB operations based on the artificial metric values. In this manner, various what-if scenarios may be tested based on different staged testing configurations.

As noted above, orchestration framework 104 may be tested in various ways based on various models of a modeling framework. For instance, FIG. 7 is a flowchart 700 of a method for creating a resource management testing environment based on a database population-change events model, according to an example embodiment.

Flowchart 700 may be implemented in systems 100, 200, 300, and 400. For purposes of illustration, flowchart 700 is described with reference to FIG. 1, FIG. 2, FIG. 3, and FIG. 4. Other structural and operational embodiments will be apparent to persons skilled in the relevant art(s) based on the following discussion regarding flowchart 700.

Figure 7:
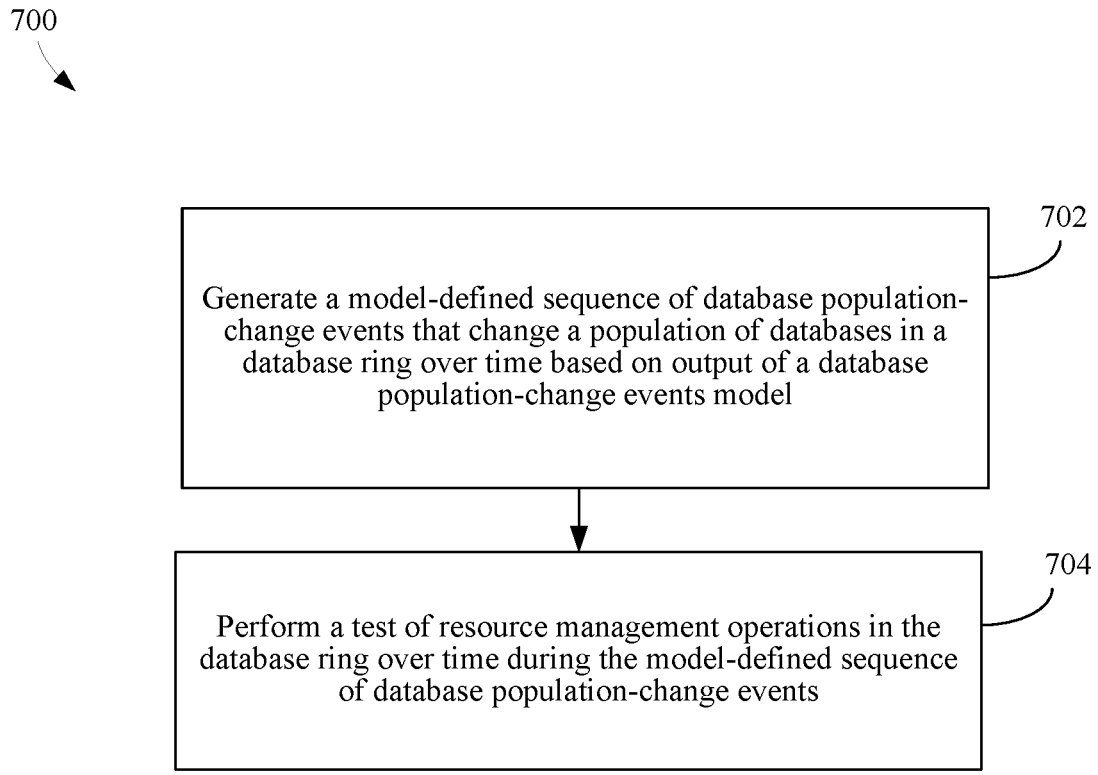
FIG. 7 is a flowchart of a method for creating a resource management testing environment based on a database population-change events model, according to an example embodiment.

Flowchart 700 of FIG. 7 begins with step 702. In step 702 a model-defined sequence of database population-change events that change a population of databases may be generated in a database ring over time based on output of a database population-change events model. For example, as shown in FIG. 2, database population-change events model 136 may be trained with data from database drop event and database add event reports from a production database system. Population manager 130 may indicate to DB population change generator 142 to add and/or drop databases in nodes 112A and 112B of cluster 110, or in other clusters, and may indicate features of those databases (e.g., SLO) based on output of database population change events model 136. Moreover, referring to FIG. 4, DB population change generator 142 may be configured to add and/or remove one or more databases from model defined database ring 302 based on output of database create events model 404 and database drop events model 406 respectively. Database create events model 404 may be configured to indicate hardware and/or software resources and/or features of the added databases, such as types and numbers of compute cores, available disk space, and available memory space.

In step 704, testing of resource management operations in the database ring may be performed over time during the model-defined sequence of database population-change events. For example, for each modified population of databases that is established by DB population change generator 142 in response to the model 136-defined sequence of database population change events, operations of resource manager 106 may be tested using artificial metrics defined by models of DB resource usage models 138. As described above, for each iteration of a modified database population in ring 110, resource metric manager 152A may read the DB resource usage model 138 XML data from model database 120, parse the model XML, and construct model objects 154A for generation of artificial resource usage metrics. When database 114A (and/or other databases in ring 110) is ready to report its artificial metrics to resource manager 106 for a current DB population, for testing purposes, database 114A issues an RPC to resource metric manager 152A, which consults model objects 154A, determines the artificial resource usage metric values, and returns the artificial metric values to database 114A. In response to receiving the artificial metric values, database 114A transmits the artificial metric values to resource manager 106, which in turn, generates control output 150 and performs PLB operations in ring 110 based on the artificial metric values. In this manner, various what-if scenarios may be tested based on different staged testing configurations.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 200 of FIG. 2, system 300 of FIG. 3, and system 400 of FIG. 4, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 8:
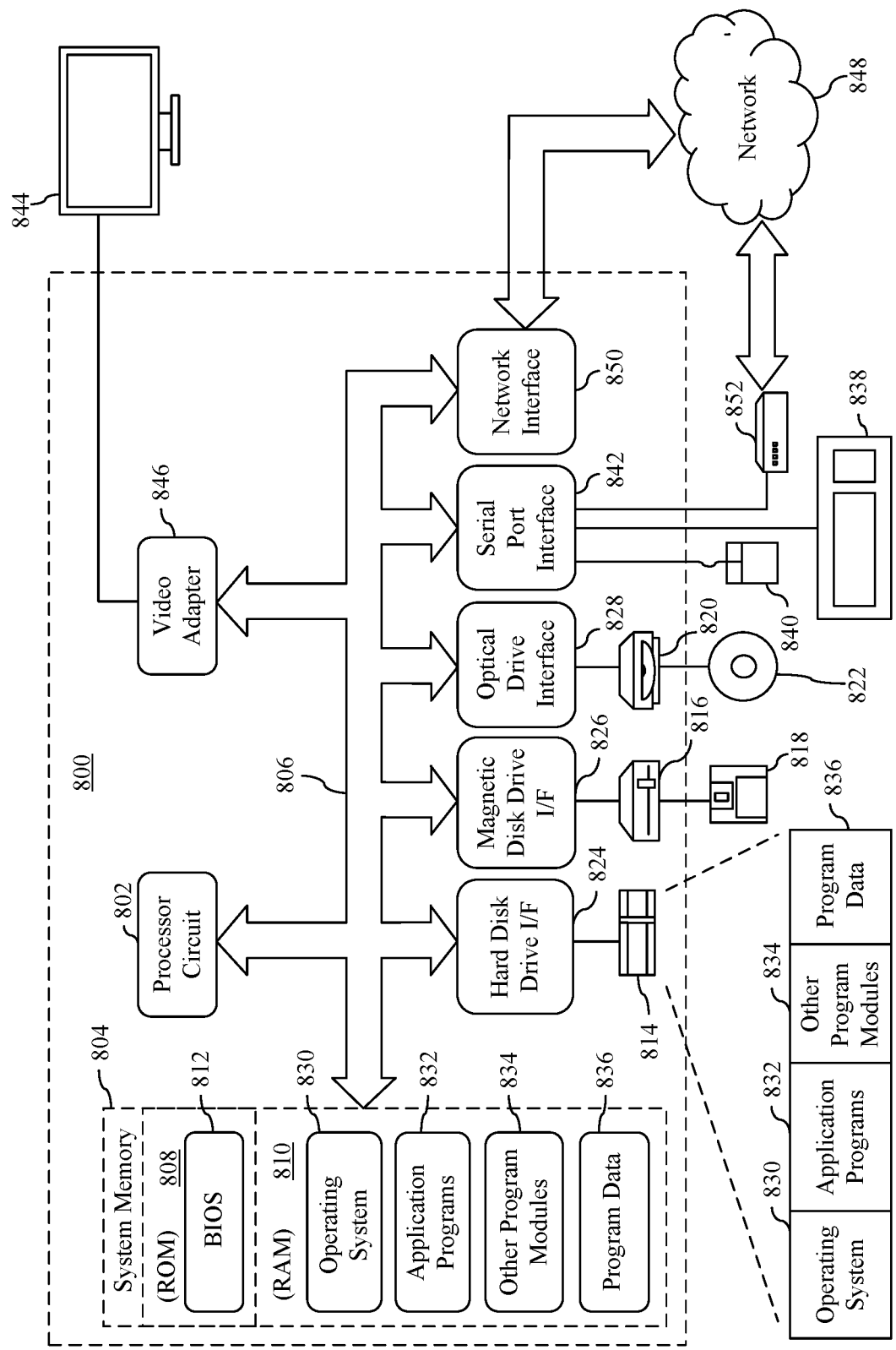
FIG. 8 is a block diagram of an example processor-based computer system that may be used to implement various embodiments.

FIG. 8 is a block diagram of an example processor-based computer system 800 that may be used to implement various embodiments. The computing devices of system 100, including computing devices hosting nodes 102, nodes 112A-112B, user interface 126, DB resource usage models 138, and population manager 130 may each include any type of computing device, mobile or stationary, such as a desktop computer, a server, a video game console, etc. For example, any of the computing devices of system 100, including computing devices hosting nodes 102, nodes 112A-112B, user interface 126, DB resource usage models 138, and population manager 130 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo WHO or Switch®, etc.), etc.

The computing devices of system 100, including computing devices hosting nodes 102, nodes 112A-112B, user interface 126, DB resource usage models 138, and population manager 130 may each be implemented in one or more computing devices containing features similar to those of computing device 800 in stationary or mobile computer embodiments and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing ring 110, user interface 126, population manager 130, control nodes 102, data nodes 112, orchestration framework 104, model database 120, resource manager 106, administrator API 122, database resource usage model 138, initial database population generator 140, database population-change generator 142, resource metric manager 152A, database 114A, database 114B, database 114C, model objects 154A, load orchestrator 108A, resource metric manager 152B, database 114D, database 114E, model objects 154B, load orchestrator 108B, ring grouping model 132, initial database population model 134, database population-change events model 136, model defined SQL database ring 302, SQL databases, remote storage databases, local storage databases, database population-change events model 402, database create events model 404, database drop events model 406, flowchart 500, flowchart 600, flowchart 700, and/or further embodiments described herein. Program data 836 may include user input parameters 124, control output 150, user defined input parameters and production telemetry of input 202, existing databases, newly created databases, model controlled simulations for database resource usage growth of output 206, model defined database attributes, SLO attributes, version or generation of hardware and/or software, available compute cores or CPU, available disk space, and available memory for the databases, and/or further embodiments described herein.

A user may enter commands and information into computing device 600 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system for creating a resource management testing environment comprises one or more processors and one or more memory devices that store program code to be executed by the one or more processors. The program code comprises an initial database (DB) population generator configured to establish a model-defined initial population of databases in a database ring of a database system. The model-defined initial population of databases comprises a model-defined count of databases and proportions of different model-defined types of databases based on output of an initial database population model. A DB population-change generator is configured to generate a model-defined sequence of database population-change events that are used to change the population of the databases in the database ring over time based on output of a database population-change events model. An orchestration framework is configured to perform a test of resource management in the database system based on the model-defined initial population of databases and the model defined populations of databases changed over time based on the output of the database population-change events model.

In an embodiment of the foregoing system, at least one of the following occurs according to the model-defined sequence of database population-change events: the model-defined count of databases within the database ring changes over time, or the proportions of the different model-defined types of databases within the database ring changes over time.

In an embodiment of the foregoing system, a type of database of the different model-defined types of databases is determined based on one or more of the following: a type of software utilized for the database, a type of hardware utilized for the database, a generation of software utilized for the database, a generation of hardware utilized for the database, a configuration of software components of the database, a configuration of hardware components of the database, available disk capacity, available memory capacity, a number of compute cores, and remote or local database storage type.

In an embodiment of the foregoing system, the model-defined sequence of database population-change events comprises at least one of a create database event or a drop database event.

In an embodiment of the foregoing system, the program code further comprises a database ring grouping generator configured to generate a plurality of model-defined ring groups comprising at least the database ring based on output of a ring grouping model trained based on resource utilization metrics of a production database system. The database ring belongs to a classification that is based on at least one resource utilization metric dimension and at least one resource utilization metric level type defined based on the output of the ring grouping model.

In an embodiment of the foregoing system, the program code further comprises a database resource usage generator configured to generate a model-defined set of database resource usage metrics for a database in a current population of databases. The current population of databases comprises one of the initial population of databases or a subsequent population of databases. The database reports the model-defined set of database resource usage metrics to an orchestration framework for testing at least one of database placement, load balancing, or scaling operations in the database ring by the orchestration framework in response to the reported model-defined set of database resource usage metrics.

In an embodiment of the foregoing system, the database resource usage generator is further configured to iteratively generate a new model-defined set of database resource usage metrics for a database of a subsequent current population of databases as the current population of databases iteratively changes over time. Each current population of databases comprises at least one of the model-defined initial population of databases or a subsequent model-defined population of databases.

In an embodiment of the foregoing system, the model-defined set of database resource usage metrics comprises at least one of model-defined compute resource usage, model-defined memory usage, or model-defined disk usage and models utilized for defining the set of database resource usage metrics are trained based on resource usage metrics of a production database system.

In an embodiment of the foregoing system, the model-defined set of database resource usage metrics is determined based on individual database resource usage metrics models for each different type of resource usage metric including one or more of the following individual database resource usage metrics models: a disk space model based on disk space changes between timestamps where the disk space model comprises one or more disk space sub-models. The one or more disk space sub-models includes one or more of a steady-state growth model for databases with local database storage and for databases with remote database storage, a predictable rapid growth model for databases with local database storage, or an initial creation growth model for created or restored databases. A memory usage model comprises one or more memory usage sub-models, the one or more memory usage sub-models including one or more of a steady-state growth model to model steady-state growth of database level memory usage, and an initial creation model to model memory usage in a time period at database creation time.

In an embodiment of the foregoing system, the current population of databases comprises a local storage database. The local storage database is configurable as stateful. The database resource usage generator comprises a disk usage model that generates disk usage metrics of the model-defined set of database resource usage metrics for the local storage database. The database resource usage generator is further configured to, in response to the local storage database being configured as stateful, store the disk usage metrics to permanent memory for the local storage database to persist the state of the disk usage model, and read the disk usage metrics from permanent memory after a failover of the local storage database for reporting disk usage metrics to the orchestration framework after the failover.

In an embodiment, a system for creating a resource management testing environment comprises one or more processors and one or more memory devices that store program code to be executed by the one or more processors. The program code comprises an initial database (DB) population generator configured to establish a model-defined initial population of databases in a database ring where each database in the initial population has an initial resource utilization metric value determined based on output of an initial database population model. The initial database population model is trained based on resource usage metrics of a production database system. The initial population of databases in the database ring comprises a count of databases having different types of databases that are determined based on the initial database population model. An orchestration framework is configured to perform a test of a resource manager for the database ring utilizing the initial resource utilization metric value of at least one database of the model defined initial population of databases.

In an embodiment of the foregoing system, types of the different types of databases in the initial population comprise local-storage databases or remote-storage databases determined based on the initial database population model.

In an embodiment of the foregoing system, types of the different types of databases in the initial population comprise different resource capacities or different resource counts in the initial population of databases determined based on the initial database population model.

In an embodiment of the foregoing system, the initial database population model receives input comprising one or more test scenario parameters for: target resource utilization levels, target range of number of databases, and target ring group classification, for defining the initial population of databases and each initial resource utilization metric value for each database of the initial population of databases.

In an embodiment of the foregoing system, the database ring is classified according to at least one type of resource usage metric level determined based on output of a ring grouping model. The ring grouping model is trained based on database resource usage metrics of a production database system and outputs a definition for at least one ring group comprising the database ring.

In an embodiment of the foregoing system, the orchestration framework is further configured to perform a test of the resource manager for the database ring utilizing a subsequent resource utilization metric value of at least one database of a subsequent model defined population of databases, and perform a test of the resource manager in the database system based on a sequence of model defined database population-change events.

In an embodiment, a system for managing a resource management testing environment comprises one or more processors and one or more memory devices that store program code to be executed by the one or more processors. The program code comprises a database (DB) population-change generator configured to generate a model-defined sequence of database population-change events that change a population of databases in a database ring over time based on output of a database population-change events model. An orchestration framework is configured to perform a test of resource management operations in the database ring over time during the model-defined sequence of database population-change events.

In an embodiment of the foregoing system, a count of databases within the database ring changes over time according to the sequence of population-change events.

In an embodiment of the foregoing system, types of different types of databases within the database ring change over time according to the model-defined sequence of database population-change events.

In an embodiment of the foregoing system, the program code further comprises a database resource usage generator configured to generate a model-defined set of database resource usage metrics for at least one database in the database ring for each changed population of databases in the database ring over time. At least one database reports the model-defined set of database resource usage metrics to the orchestration framework for controlling at least one of database placement, load balancing, or scaling operations in the database ring by the orchestration framework in response to the reported model-defined set of database resource usage metrics.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system for creating a resource management testing environment, the system comprising:
    one or more processors; and
    one or more memory devices that store program code to be executed by the one or more processors, the program code comprising:
        an initial database (DB) population generator configured to:
            establish a model-defined initial population of databases in a database ring of a database system, the model-defined initial population of databases comprising a model-defined count of databases and proportions of different model-defined types of databases based on output of an initial database population model;
        a DB population-change generator configured to:
            generate a model-defined sequence of database population-change events that are used to change the population of the databases in the database ring over time based on output of a database population-change events model, wherein the database population-change events model is trained based on production telemetry data to mimic behavior of a production system; and
        an orchestration framework configured to:
            perform a test of resource management in the database system based on the model-defined initial population of databases and the model defined populations of databases changed over time based on the output of the database population-change events model.

2. The system of claim 1, wherein at least one of the following occurs according to the model-defined sequence of database population-change events:
    the model-defined count of databases within the database ring changes over time; or
    the proportions of the different model-defined types of databases within the database ring changes over time.

3. The system of claim 1, wherein a type of database of the different model-defined types of databases is determined based on one or more of the following:
    a type of software utilized for the database,
    a type of hardware utilized for the database,
    a generation of software utilized for the database,
    a generation of hardware utilized for the database,
    a configuration of software components of the database,
    a configuration of hardware components of the database,
    available disk capacity,
    available memory capacity,
    a number of compute cores, and
    remote or local database storage type.

4. The system of claim 1, wherein the model-defined sequence of database population-change events comprises at least one of a create database event or a drop database event.

5. The system of claim 1, wherein the program code further comprises a database ring grouping generator configured to:
    generate a plurality of model-defined ring groups comprising at least the database ring based on output of a ring grouping model trained based on resource utilization metrics of a production database system,
    wherein the database ring belongs to a classification that is based on at least one resource utilization metric dimension and at least one resource utilization metric level type defined based on the output of the ring grouping model.

6. The system of claim 1, wherein the program code further comprises a database resource usage generator configured to:
    generate a model-defined set of database resource usage metrics for a database in a current population of databases; wherein:
        the current population of databases comprises one of the initial population of databases or a subsequent population of databases, and
        the database in the current population of databases reports the model-defined set of database resource usage metrics to the orchestration framework for testing at least one of database placement, load balancing, or scaling operations in the database ring by the orchestration framework in response to the reported model-defined set of database resource usage metrics.

7. The system of claim 6, wherein the model-defined set of database resource usage metrics comprises at least one of model-defined compute resource usage, model-defined memory usage, or model-defined disk usage and models utilized for defining the set of database resource usage metrics are trained based on resource usage metrics of a production database system.

8. A system, for creating a resource management testing environment, the system comprising:
one or more processors; and
one or more memory devices that store program code to be executed by the one or more processors, the program code comprising:
an initial database (DB) population generator configured to:
establish a model-defined initial population of databases in a database ring where each database in the initial population has an artificial initial resource utilization metric value determined based on output of an initial database population model, wherein the initial database population model is trained based on resource usage metrics of a production database system;
wherein the initial population of databases in the database ring comprises a count of databases having different types of databases that are determined based on the initial database population model; and
an orchestration framework configured to:
perform a test of a resource manager for the database ring utilizing the artificial initial resource utilization metric value, wherein the resource manager receives the artificial initial resource utilization metric value from at least one database of the model defined initial population of databases.

9. The system of claim 8, wherein types of the different types of databases in the initial population comprise local-storage databases or remote-storage databases determined based on the initial database population model.

10. The system of claim 8, wherein types of the different types of databases in the initial population comprise different resource capacities or different resource counts in the initial population of databases determined based on the initial database population model.

11. The system of claim 8, wherein the initial database population model receives input comprising one or more test scenario parameters for:
target resource utilization levels,
target range of number of databases, and
target ring group classification,
for defining the initial population of databases and each artificial initial resource utilization metric value for each database of the initial population of databases.

12. The system of claim 8, wherein the database ring is classified according to at least one type of resource usage metric level determined based on output of a ring grouping model, wherein the ring grouping model is trained based on database resource usage metrics of a production database system and outputs a definition for at least one ring group comprising the database ring.

13. The system of claim 8, wherein the orchestration framework is further configured to:
perform a test of the resource manager for the database ring utilizing a subsequent artificial resource utilization metric value of at least one database of a subsequent model defined population of databases; and
perform a test of the resource manager in the database system based on a sequence of model defined database population-change events.

14. A system for managing a resource management testing environment, the system comprising:
one or more processors; and
one or more memory devices that store program code to be executed by the one or more processors, the program code comprising:
a database (DB) population-change generator configured to:
generate a model-defined sequence of database population-change events that change a population of databases in a database ring over time based on output of a database population-change events model, wherein the database population-change events model is trained based on production telemetry data to mimic behavior of a production system; and
an orchestration framework configured to:
perform a test of resource management operations in the database ring over time during the model-defined sequence of database population-change events.

15. The system of claim 14, wherein a count of databases within the database ring changes over time according to the model-defined sequence of population-change events.

16. The system of claim 14, wherein types of different types of databases within the database ring change over time according to the model-defined sequence of database population-change events.

17. The system of claim 14, wherein the program code further comprises a database resource usage generator configured to:
generate a model-defined set of database resource usage metrics for at least one database in the database ring for each changed population of databases in the database ring over time;
wherein at least one database reports the model-defined set of database resource usage metrics to the orchestration framework for controlling at least one of database placement, load balancing, or scaling operations in the database ring by the orchestration framework in response to the reported model-defined set of database resource usage metrics.

18. A system for creating a resource management testing environment, the system comprising:
a processor; and
a memory device that stores program code to be executed by the processor, the program code comprising:
an initial database (DB) population generator configured to:
establish a model-defined initial population of databases in a database ring of a database system, the model-defined initial population of databases comprising a model-defined count of databases and proportions of different model-defined types of databases based on output of an initial database population model;
a DB population-change generator configured to:
generate a model-defined sequence of database population-change events that are used to change the population of the databases in the database ring over time based on output of a database population-change events model; and
an orchestration framework configured to:
perform a test of resource management in the database system based on the model-defined initial population of databases and the model defined populations of databases changed over time based on the output of the database population-change events model; and a database ring grouping generator configured to:
  generate a plurality of model-defined ring groups comprising at least the database ring based on output of a ring grouping model trained based on resource utilization metrics of a production database system,
  wherein the database ring belongs to a classification that is based on at least one resource utilization metric dimension and at least one resource utilization metric level type defined based on the output of the ring grouping model.

19. A system for creating a resource management testing environment, the system comprising:
  a processor; and
  a memory device that stores program code to be executed by the processor, the program code comprising:
    an initial database (DB) population generator configured to:
      establish a model-defined initial population of databases in a database ring of a database system, the model-defined initial population of databases comprising a model-defined count of databases and proportions of different model-defined types of databases based on output of an initial database population model;
    a DB population-change generator configured to:
      generate a model-defined sequence of database population-change events that are used to change the population of the databases in the database ring over time based on output of a database population-change events model; and
    an orchestration framework configured to:
      perform a test of resource management in the database system based on the model-defined initial population of databases and the model defined populations of databases changed over time based on the output of the database population-change events model; and
    a database resource usage generator configured to:
      generate a model-defined set of database resource usage metrics for a database in a current population of databases; wherein:
        the current population of databases comprises one of the initial population of databases or a subsequent population of databases, and
        the database in the current population of databases reports the model-defined set of database resource usage metrics to the orchestration framework for testing at least one of database placement, load balancing, or scaling operations in the database ring by the orchestration framework in response to the reported model-defined set of database resource usage metrics.

20. The system of claim 19, wherein the database resource usage generator is further configured to:
  iteratively generate a new model-defined set of database resource usage metrics for a database of a subsequent current population of databases as the current population of databases iteratively changes over time, wherein each current population of databases comprises at least one of the model-defined initial population of databases or a subsequent model-defined population of databases.

21. The system of claim 19, wherein the model-defined set of database resource usage metrics is determined based on individual database resource usage metrics models for each different type of resource usage metric including one or more of the following individual database resource usage metrics models:
  a disk space model based on disk space changes between timestamps, the disk space model comprising one or more disk space sub-models, the one or more disk space sub-models including one or more of:
    a steady-state growth model for databases with local database storage and for databases with remote database storage;
    a predictable rapid growth model for databases with local database storage; or
    an initial creation growth model for created or restored databases; and
  a memory usage model comprising one or more memory usage sub-models, the one or more memory usage sub-models including one or more of:
    a steady-state growth model to model steady-state growth of database level memory usage; and
    an initial creation model to model memory usage in a time period at database creation time.

22. The system of claim 19, wherein:
  the current population of databases comprises a local storage database;
  the local storage database is configurable as stateful;
  the database resource usage generator comprises a disk usage model that generates disk usage metrics of the model-defined set of database resource usage metrics for the local storage database; and
  the database resource usage generator is further configured to:
    in response to the local storage database being configured as stateful, store the disk usage metrics to permanent memory for the local storage database to persist the state of the disk usage model; and
    read the disk usage metrics from permanent memory after a failover of the local storage database for reporting disk usage metrics to the orchestration framework after the failover.

23. A system, for creating a resource management testing environment, the system comprising:
  a processor; and
  a memory device that stores program code to be executed by the processor, the program code comprising:
    an initial database (DB) population generator configured to:
      establish a model-defined initial population of databases in a database ring where each database in the initial population has an artificial initial resource utilization metric value determined based on output of an initial database population model, wherein the initial database population model is trained based on resource usage metrics of a production database system;
      wherein the initial population of databases in the database ring comprises a count of databases having different types of databases that are determined based on the initial database population model; and
    an orchestration framework configured to:
      perform a test of a resource manager for the database ring utilizing the artificial initial resource utilization metric value of at least one database of the model defined initial population of databases;
      perform a test of the resource manager for the database ring utilizing a subsequent artificial resource utilization metric value of at least one database of a subsequent model defined population of databases; and perform a test of the resource manager in the database system based on a sequence of model defined database population-change events.

\* \* \* \* \*